(12) United States Patent
Lee et al.

(10) Patent No.: US 9,978,260 B2
(45) Date of Patent: May 22, 2018

(54) METHOD AND APPARATUS FOR CONTROLLING A HOME DEVICE REMOTELY IN A HOME NETWORK SYSTEM

(71) Applicant: Samsung Electronics Co., Ltd., Suwon-si, Gyeonggi-do (KR)

(72) Inventors: Keun-Cheol Lee, Incheon (KR); Ji-Hyeon Kweon, Yongin-si (KR); Kyung-Jae Kim, Suwon-si (KR); Jae-Won Choi, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 827 days.

(21) Appl. No.: 14/132,388

(22) Filed: Dec. 18, 2013

(65) Prior Publication Data

US 2014/0167931 A1    Jun. 19, 2014

(30) Foreign Application Priority Data

Dec. 18, 2012  (KR) ........................ 10-2012-0148738

(51) Int. Cl.
 *G08C 17/02*   (2006.01)
 *H04L 29/06*   (2006.01)

(52) U.S. Cl.
 CPC ......... *G08C 17/02* (2013.01); *G08C 2201/31* (2013.01); *G08C 2201/41* (2013.01); *G08C 2201/42* (2013.01); *G08C 2201/93* (2013.01); *H04L 65/1069* (2013.01)

(58) Field of Classification Search
 CPC ........................ G08C 17/02; G08C 2201/31; G08C 2201/41; G08C 2201/42; G08C 2201/93; H04L 65/1069; H04W 4/04
 See application file for complete search history.

(56) References Cited

U.S. PATENT DOCUMENTS

| | | | |
|---|---|---|---|
| 8,019,352 B2* | 9/2011 | Rappaport | G01S 5/0252 340/988 |
| 8,792,419 B2* | 7/2014 | Wohlert | H04W 4/04 370/328 |
| 2004/0006477 A1 | 1/2004 | Craner | |
| 2005/0071879 A1* | 3/2005 | Haldavnekar | A61B 5/0062 725/81 |

(Continued)

FOREIGN PATENT DOCUMENTS

| | | |
|---|---|---|
| CN | 101917530 A | 12/2010 |
| KR | 10-2008-0096239 A | 10/2008 |

(Continued)

*Primary Examiner* — Mohamed Barakat
(74) *Attorney, Agent, or Firm* — Jefferson IP Law, LLP

(57) ABSTRACT

Provided is a remote control method and apparatus in a home network system including multiple home devices. The remote control method includes receiving operation state information from the respective multiple home devices, receiving a control command for operation control of at least one of the multiple home devices from a user device, determining a control target home device based on the control command, sending the control command to the determined control target home device, receiving processing result information corresponding to execution of the control command from the control target home device, and transmitting the processing result information to the user device.

38 Claims, 17 Drawing Sheets

(56) References Cited

U.S. PATENT DOCUMENTS

| | | | | |
|---|---|---|---|---|
| 2005/0159823 | A1* | 7/2005 | Hayes | G05B 15/02 |
| | | | | 700/19 |
| 2008/0026725 | A1* | 1/2008 | Cha | H04M 1/2535 |
| | | | | 455/411 |
| 2008/0254807 | A1* | 10/2008 | Duplessis | H04W 16/16 |
| | | | | 455/450 |
| 2011/0106279 | A1* | 5/2011 | Cho | G08C 17/02 |
| | | | | 700/90 |
| 2011/0138327 | A1 | 6/2011 | Scott et al. | |
| 2012/0265538 | A1 | 10/2012 | Gustafsson et al. | |
| 2013/0171981 | A1 | 7/2013 | Woo | |

FOREIGN PATENT DOCUMENTS

| | | | |
|---|---|---|---|
| KR | 20080096239 A | * | 10/2008 |
| KR | 10-2011-0047764 A | | 5/2011 |
| WO | 2012/036475 A2 | | 3/2012 |

* cited by examiner

METHOD AND APPARATUS FOR CONTROLLING A HOME DEVICE REMOTELY IN A HOME NETWORK SYSTEM

PRIORITY

This application claims priority under 35 U.S.C. § 119(a) to a Korean Patent Application filed in the Korean Intellectual Property Office on Dec. 18, 2012 and assigned Serial No. 10-2012-0148738, the contents of which are incorporated herein by reference.

BACKGROUND OF THE INVENTION

1. Field of the Invention

The present disclosure generally relates to a home network system, and more particularly, to a method and apparatus for remotely controlling an operation of a home device.

2. Description of the Related Art

A home network system refers to a system in which various home devices installed in home are connected over a wired or wireless network to enable communication between the home devices. An advanced home network system integrates home devices through a Home Gateway (HGW or H-GW) to connect them over an external public data network, for example, an Internet Protocol (IP) network (that is, the Internet), thus providing a wider variety of services associated with the Internet. The home network system may control home devices according to users' demands to provide services desired by the users.

As types of home devices have been diversified and users' demands have also been diversified accordingly, a need has arisen for much effort to accept various users' demands and provide the best services.

SUMMARY OF THE INVENTION

Accordingly, an aspect of the present disclosure is to provide a method and apparatus for remotely controlling an operation of a home device in a home network system.

Another aspect of the present disclosure is to provide a method and apparatus for remotely controlling an operation of a home device by using a voice command in a home network system.

Still another aspect of the present disclosure is to provide a method and apparatus for remotely controlling an operation of a home device on a room basis in a home network system.

Yet another aspect of the present disclosure is to provide a method and apparatus for controlling an operation of a home device based on a user profile in a home network system.

In accordance with an aspect of the present disclosure, there is provided a remote control method in a home network system including multiple home devices, the remote control method including receiving operation state information from the respective multiple home devices, receiving a control command for operation control of at least one of the multiple home devices from a user device, determining a control target home device based on the control command, sending the control command to the determined control target home device, receiving processing result information corresponding to execution of the control command from the control target home device, and transmitting the processing result information to the user device.

In accordance with another aspect of the present disclosure, there is provided a gateway apparatus for remote control in a home network system including multiple home devices, the gateway apparatus including at least one communication module configured to communicate with the multiple home devices and a user device in a wired/wireless manner and a controller configured to control operations of receiving operation state information from the respective multiple home devices, receiving a control command for operation control of at least one of the multiple home devices from a user device, determining a control target home device based on the control command, sending the control command to the determined control target home device, receiving processing result information corresponding to execution of the control command from the control target home device, and transmitting the processing result information to the user device.

In accordance with still another aspect of the present disclosure, there is provided a remote control method in a home network system including multiple home devices, the remote control method including sending a control command for operation control of at least one of the multiple home devices to a Home GateWay (HGW) that collects operation state information of the multiple home devices and controls operations of the multiple home devices and receiving processing result information corresponding to execution of the control command from the HGW in response to the sending of the control command, in which the control command is generated by recognizing a voice command of a user.

In accordance with yet another aspect of the present disclosure, there is provided a user device for remote control in a home network system including multiple home devices, the user device including at least one communication module configured to communicate with a network entity that controls operations of the multiple home devices and a controller configured to control operations of sending a control command for operation control of at least one of the multiple home devices to a Home GateWay (HGW) that collects operation state information of the multiple home devices and controls operations of the multiple home devices and receiving processing result information corresponding to execution of the control command from the HGW in response to the sending of the control command, in which the control command is generated by recognizing a voice command of a user.

DETAILED DESCRIPTION OF THE PREFERRED EMBODIMENTS

In the following description of the present disclosure, a detailed description of known functions and configurations incorporated herein will be omitted when it may obscure the subject matter of the present disclosure. Hereinafter, various embodiments of the present disclosure will be described with reference to the accompanying drawings.

Figure 1:
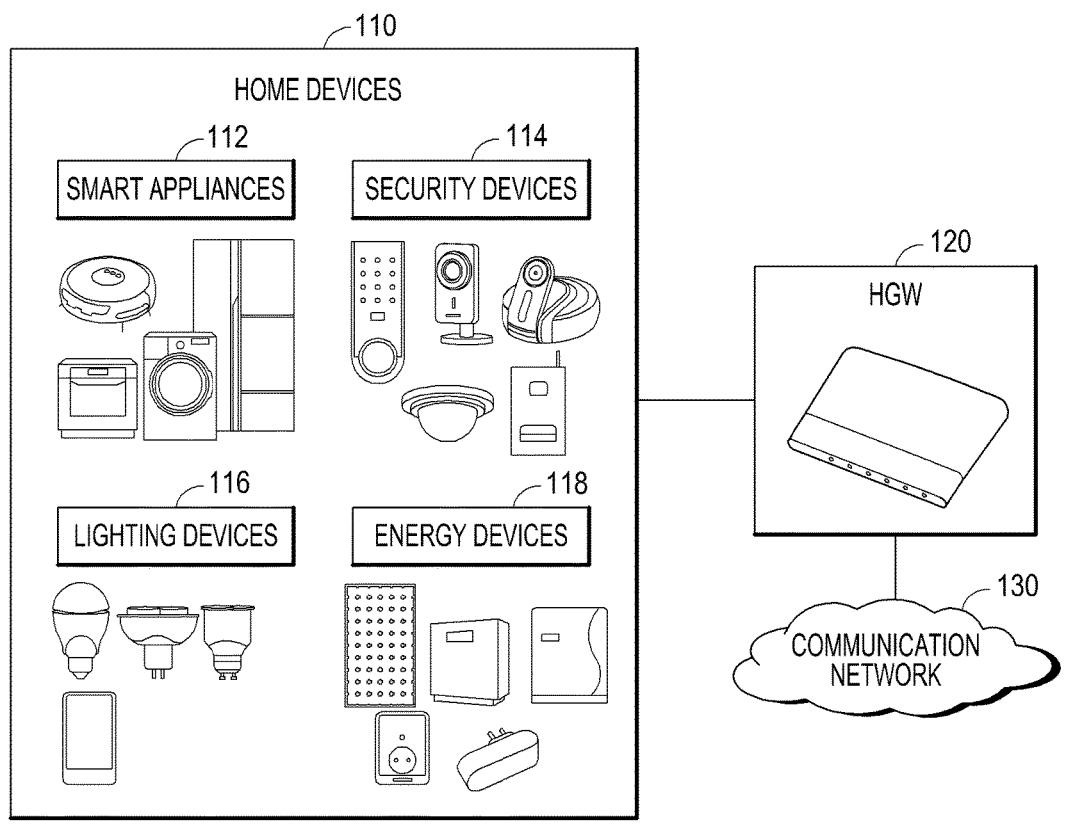
FIG. 1 is a schematic diagram illustrating a structure of a home network system according to an embodiment of the present disclosure.

FIG. 1 is a schematic diagram illustrating a structure of a home network system according to an embodiment of the present disclosure. Referring to FIG. 1, a home network system may include home devices 110 and a Home GateWay (HGW) 120 having control and communication functions. The home devices 110 may include smart appliances 112, security devices 114, lighting devices 116, and energy devices 118 that are located in home. For example, the smart appliances 112 may include a refrigerator, a washing machine, a robot vacuum cleaner, and the like. The security devices 114 may include a door lock system, a security camera, a security sensor, and so forth. The lighting devices 116 may include a fluorescent light, Light Emitting Diode (LED) lighting device and the like. The energy devices 118 may include a power meter, a power socket, an electric outlet, a multi-tap, and so forth. The home devices 110 may also include a Personal Computer (PC), an Internet Protocol (IP) camera, an Internet phone, a wired/wireless phone, and a mobile phone.

The home devices 110 may communicate with the HGW 110 in a wired or wireless manner, and may receive a control command from the HGW 120 and transmit requested information to the HGW 120. The HGW 120 may include communication modules for communicating with the home devices 110 based on a wired communication or a wireless communication, a storing unit for registering and storing information of the home devices 110, and a controller for controlling operations and states of the home devices 110, collecting needed information from the home devices 110, and managing the collected information. In particular, the HGW 120 allows connection from an external communication terminal (not illustrated) through a communication network 130 and transmits a control signal received from the external communication terminal to a corresponding home device through the HGW 120. The communication network 130 may include at least one of an Internet Protocol (IP) network such as the Internet and a wireless network to which the mobile terminal is connectible.

The home network system as illustrated in FIG. 1 may provide a home entertainment service, such as an Internet TV (IPTV) and a Video on Demand (VoD), which use the communication network 130, a home data communication service, such as data sharing, Voice over IP (VoIP), and video communication, and a home automation service, such as remote control and remote gauge examination of electronic appliances, crime prevention, and disaster prevention. That is, the home network system illustrated in FIG. 1 connects most of the home devices 110 used inside and outside the home through a single network to control them. Thus, in the specification, the expression "in home" may be understood as "inside/outside home".

The user may connect to the HGW 120 included in the home network system and to each home device 110 through the HGW 120, by using an external communication terminal, for example, wireless communication equipment like a mobile terminal, in remote areas. For example, the mobile terminal may be a Personal Digital Assistant (PDA) having a communication function, a smartphone, a cellular phone, a tablet computer, a laptop computer, or the like, and may connect to the home network system through a common carrier network and the Internet.

Figure 2A:
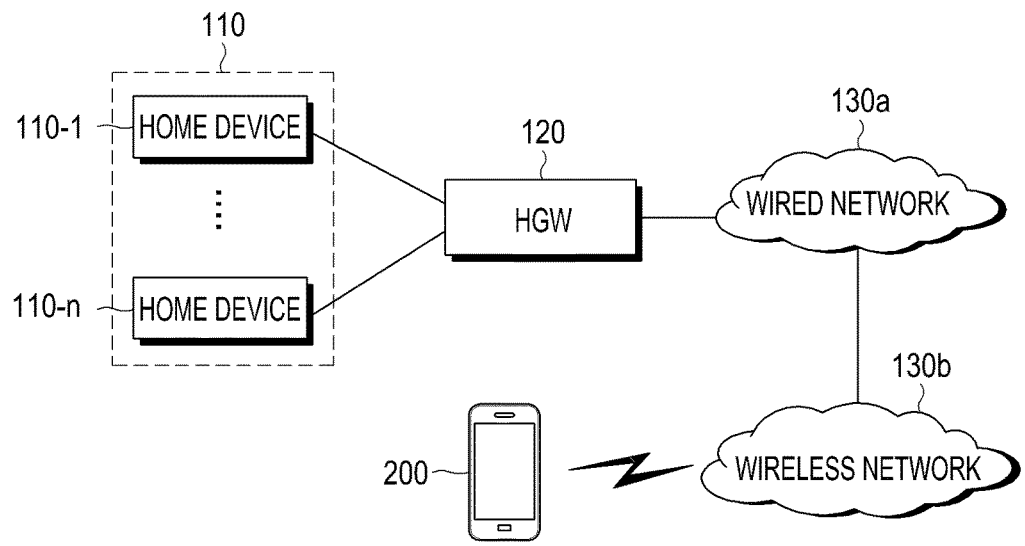
FIG. 2A is a schematic diagram illustrating a structure of a home network system connectable with a mobile terminal according to an embodiment of the present disclosure.

FIG. 2A is a schematic diagram illustrating a structure of a home network system connectable with a mobile terminal according to an embodiment of the present disclosure.

Referring to FIG. 2A, the home devices 110-1 to 110-n (110) in the home network system connects to the HGW 120 based on a wired or wireless communication. The HGW 120 connects to a wired network 130a such as the Internet.

A registered mobile terminal 200 connects to a wireless network 130b including a wireless access network and a carrier core network, and accesses the HGW 120 through the wired network 130a connected with the wireless network 130b. The wireless network 130b may comply with a $2^{nd}$ Generation (2G) or $3^{rd}$ Generation (3G) cellular communication system, the $3^{rd}$ Generation Partnership Project (3GPP), a $4^{th}$ Generation (4G) communication system, the Long-Term Evolution (LTE), and World Interoperability for Microwave Access (WiMAX), or the like. In the mobile terminal 200, a remote control application is installed to individually or commonly control operations of the home devices 140 connected with the HGW 120 and designate and control some of the operations of the home devices 140. Once the remote control application is executed, a control command for controlling an operation of the corresponding home device 140 according to a user's key input, touch input, or gesture input is delivered to the HGW 120 from the mobile terminal 200 via the wireless network 130b and the wired network 130a, and the HGW 120 controls the operation of the corresponding home device 140 according to the control command.

Figure 2B:
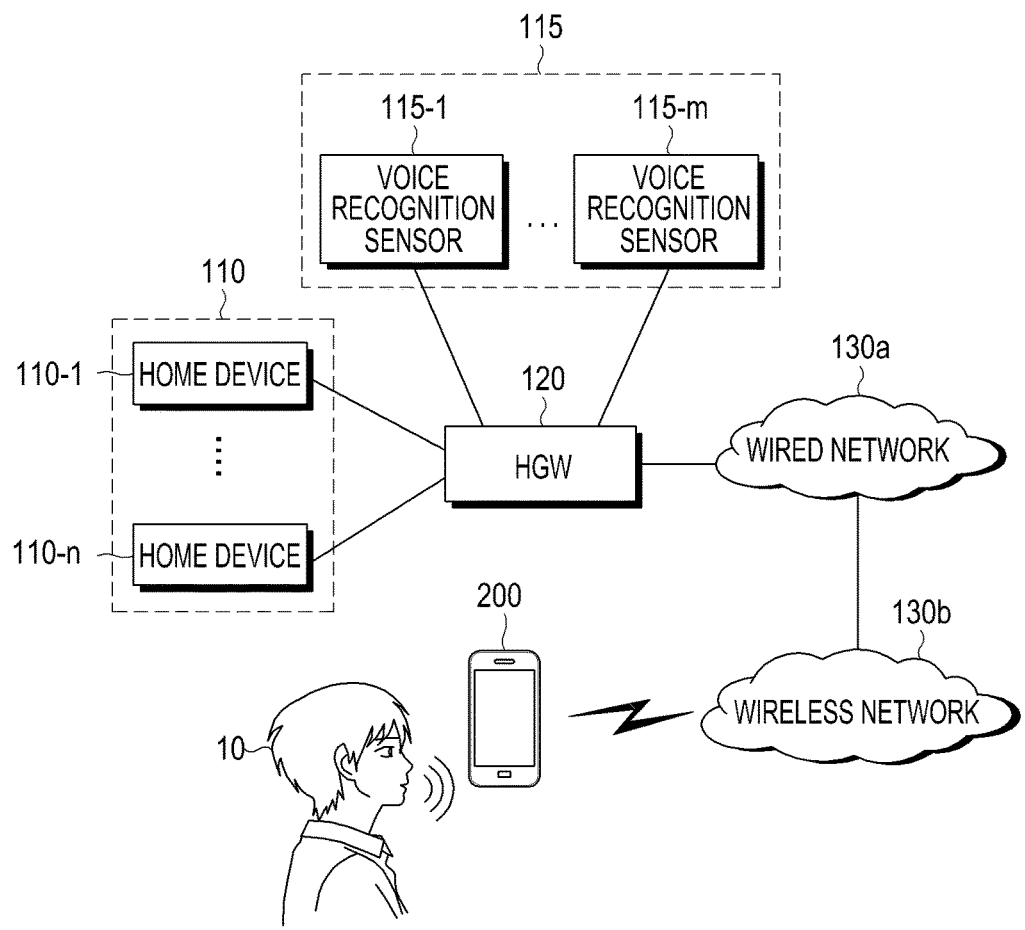
FIG. 2B is a schematic diagram illustrating a structure of a home network system remotely controlled through a mobile terminal recognizing a voice command according to an embodiment of the present disclosure.

FIG. 2B is a schematic diagram illustrating a structure of a home network system remotely controlled through a mobile terminal recognizing a voice command according to an embodiment of the present disclosure.

Referring to FIG. 2B, at least one voice recognition sensors 115-1 to 115-m (115) that recognizes a user's voice command for controlling operations of the home devices 110 through a voice are connected to the HGW 120 illustrated in FIG. 2A in a wireless or wired manner.

The voice recognition sensor 115 may be installed in home to be coupled to the home device 110 (in which the voice recognition sensor 115 is mounted on the home device 110) or to be separated from the home device 110. In another embodiment, the voice recognition sensor 115 may be installed on a room basis in home. The user's voice command recognized through the voice recognition sensor 115 is delivered to the HGW 120, which then recognizes the voice command using a voice recognition algorithm to control the operation of the corresponding home device 110. The voice recognition algorithm may use various well-known voice recognition algorithms.

The mobile terminal 200 may access the HGW 120 through the wireless network 130b and the wired network 130a as illustrated in FIG. 2A. The mobile terminal 200 recognizes a voice command of a user 10, which is input through a microphone (not illustrated), converts the voice command into a control command recognizable by the HGW 120, and delivers the control command to the HGW 120. The control command may be configured in the form of a packet including identification information of the home device 110 and control details. The control details may include a control command for a detailed operation as well as power on/off. The packet carrying the control command may include user authentication information of the mobile terminal 200.

Figure 3:
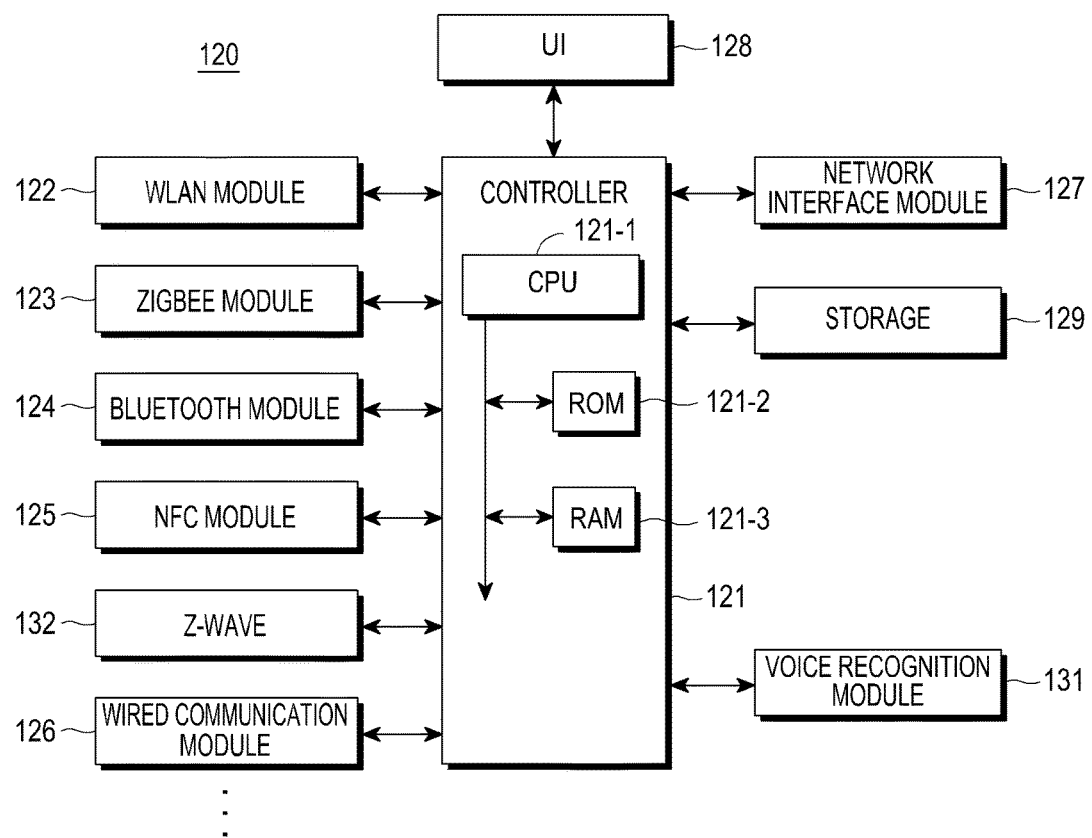
FIG. 3 is a block diagram illustrating a structure of a Home Gateway (HGW) according to an embodiment of the present disclosure.

FIG. 3 is a block diagram illustrating a structure of an HGW according to an embodiment of the present disclosure. The HGW 120 illustrated in FIG. 3 may include at least one of illustrated components.

Referring to FIG. 3, the HGW 120 is connected with multiple home devices 110-1 to 110-n by using at least one communication modules 122 to 126 and 132. The communication modules 122 to 126 and 132 include at least one of various wireless or wired communication protocol-based modules, such as a Wireless Local Area Network (WLAN) module 122 such as WiFi, a ZigBee module 123, a Bluetooth® module 124, a Near-Field Communication (NFC) module 125, a Z-WAVE module 132, and a wired communication module 126. The Z-WAVE module 122-6 adopts one of Radio Frequency (RF) techniques widely used for device control like home automation. The HGW 120 may include a controller 121, a network interface module 127, a User Interface (UI) 128, and a storage 129.

The controller 121 may include a Central Processing Unit (CPU) 121-1, a Read-Only Memory (ROM) 121-2 having stored therein a control program for controlling the HGW 120, and a Random Access Memory (RAM) 121-3 used as a memory region for a task performed in the HGW 120. The controller 121 communicates with the home devices 110-1 to 110-n through the communication modules 122 to 126 by execution of programs stored in the ROM 121-2 or the RAM 121-3 or application programs that may be stored in the storage 129, and generates a control command to send the control command to the home devices 110-1 to 110-n or stores information collected from the home devices 110-1 to 110-n in the storage 129.

The UI 128 may include an output module such as a display, a speaker, an indication lamp, or the like, and an input module (not illustrated) such as a touch screen, a keypad, a microphone, or the like. The UI 128 may be used for a user to directly control the HGW 120, register or delete the home devices 110-1 to 110-n in or from the HGW 120, or control the home devices 110-1 to 110-n through the HGW 120.

The network interface 127 may be, for example, an Internet communication module and connects the HGW 120 to an external network.

The storage 129 is configured to store program codes, data, or information needed for operations of the HGW 120 under control of the controller 121, and may also store voluminous data delivered from external devices or the home devices 110-1 to 110n when necessary.

The HGW 120 may include a voice recognition module 131 that interprets a voice command delivered from the voice recognition sensor 115 illustrated in FIG. 2B and delivers the voice command to the controller 121. For example, if the voice command is "Clean the living room", the voice recognition module 131 recognizes "clean" and "living room" and interprets "clean" as a command to be delivered to a vacuum cleaner (not illustrated) among the home devices 110 and "living room" as a cleaning location. The controller 121 sends a control command instructing the vacuum cleaner to "clean" the "living room" to the vacuum cleaner among the home devices 110 through the communication modules 122 to 126.

In another embodiment, if the user's voice command is delivered to the HGW 120 through the mobile terminal 200 rather than the voice recognition sensor 115 in home, then the mobile terminal 200 generates the control command configured in the form of a packet described in the embodiment of FIG. 2B, and delivers the generated control command to the HGW 120, such that the voice recognition module 131 of FIG. 3 may be omitted.

In still another embodiment, if there are multiple users, the HGW 120 may store user profiles for the multiple users and perform user-specific voice recognition through the voice recognition module 131 to control the home devices 110-1 to 110-n based on a user profile of the corresponding recognized user. The user profile may include user-specific voice information for recognizing a voice of each user and authority information for performing control in a predetermined authority range for each user. The user-specific voice information may be registered or stored to identify each user through the mobile terminal 200 having a voice recognition function or the HGW 120 including the voice recognition module 131.

In regard to user profiles, assuming users A and B having different authorities, the user profiles may be registered and stored such that the user A may have a control authority for all of the home devices 110-1 to 110-n in home and the user B may have a control authority for some of the home devices 110-1 to 110-n in home. The user profiles may be registered and stored through the HGW 120 or the mobile terminal 200. A user having an administrator authority may regulate a control authority of another user. User-profile-specific control may be performed through the HGW 120 or the mobile terminal 200. In the mobile terminal 200, an administration program for registering and storing the user profiles may be installed.

Figure 4:
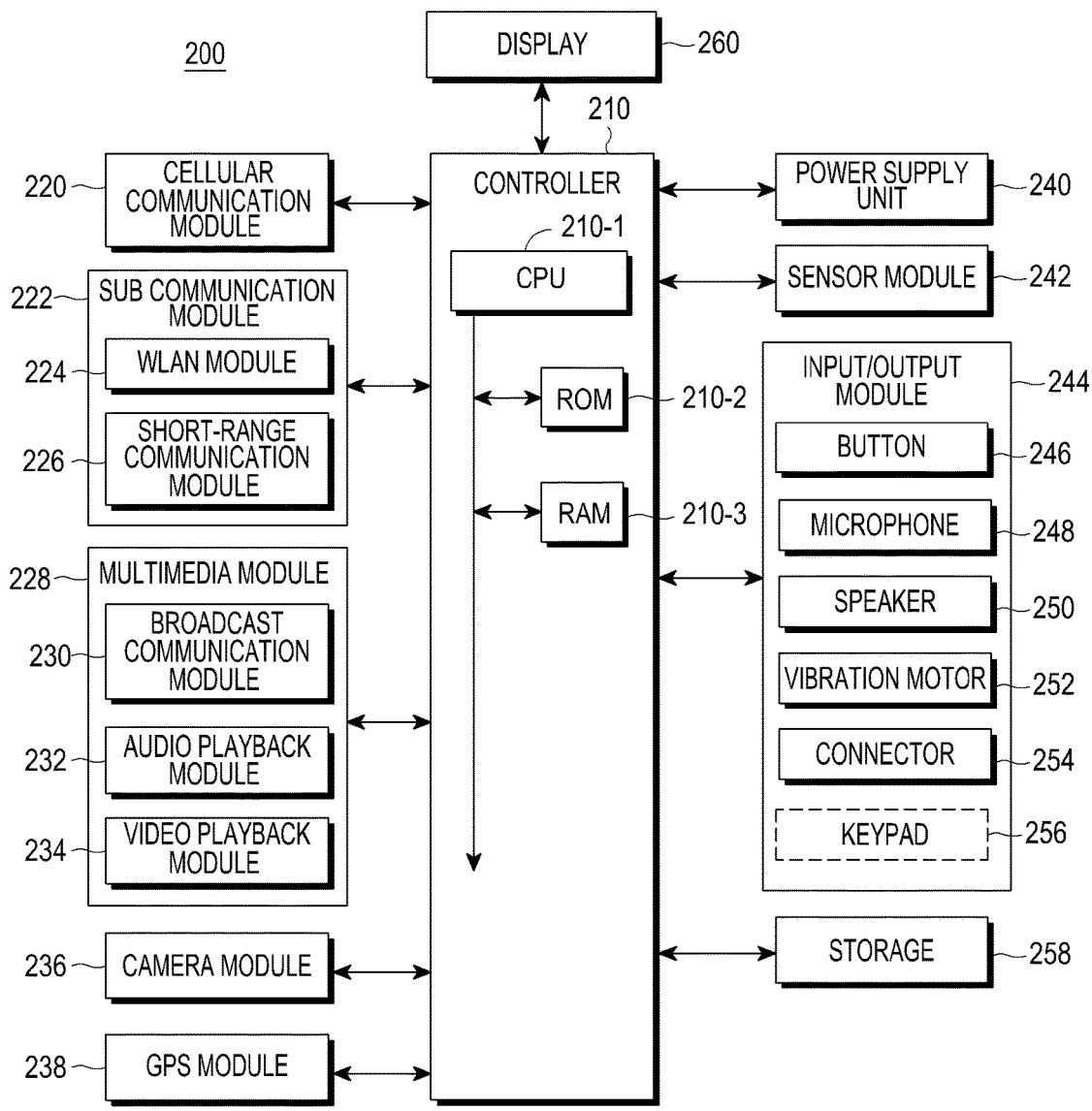
FIG. 4 is a block diagram illustrating a structure of a mobile terminal according to an embodiment of the present disclosure.

FIG. 4 is a block diagram illustrating a structure of a mobile terminal according to an embodiment of the present disclosure. The mobile terminal may include at least one of components illustrated in FIG. 4.

Referring to FIG. 4, the mobile terminal 200 may include a controller 210, a cellular mobile communication module 220, a sub communication module 222, a multimedia module 228, a camera module 236, a Global Positioning System (GPS) module 238, an input/output module 244, a sensor module 242, a storage 258, a power supply unit 240, and at least one display module 260. The camera module 236 and the GPS module 238 are selectively included. The sub communication module 130 may include at least one of a WLAN module 224 and a short-range communication module 226, and the multimedia module 228 may include at least one of a broadcast communication module 230, an audio playback module 232, and a video playback module 234. The camera module 236 may include at least one camera, and the input/output module 244 may include at least one of a button set 246, a microphone 248, a speaker 250, a vibration motor 252, a connector 254, and a keypad 256.

The controller 210 may include a CPU 210-1, a ROM 210-2 having stored therein a control program for controlling the mobile terminal 200, and a RAM 210-3 that memorizes a signal or data input from outside the mobile terminal 200 or is used as a memory region for a task performed in the mobile terminal 200, and the controller 210 controls the other components of the mobile terminal 200.

The cellular communication module 220 uses a wireless access technique based on a cellular communication protocol under control of the controller 210 to allow the mobile terminal 200 to be connected to an external device (in particular, a base station of a cellular system) via at least one or a plurality of antennas (not illustrated). The cellular communication module 220 transmits/receives a wireless signal including voice communication, video communication, a Short Messaging Service (SMS) message, or a Multimedia Messaging Service (MMS) message to/from other devices capable of performing communication. The cellular communication module 220 transmits/receives a wireless signal including short data for controlling an application or the like. The WLAN module 224 connects to the Internet in a place where a wireless Access Point (AP, not illustrated) is installed, under control of the controller 210. The short-range communication module 226 wirelessly performs short-range communication between the mobile terminal 200 and an external device under control of the controller 210. Short-range communication may include Bluetooth®, ZigBee, Infrared Data Association (IrDA), Z-WAVE, and so forth.

The display module 260 may include a touch screen that displays information of various applications (for example, call, data transmission, broadcasting, a camera, or the like) executable by the controller 210 and provides a UI configured correspondingly. The controller 210 allows a soft key displayed on the touch screen 260 to be selected or executes an application or a function corresponding to the soft key in response to a user gesture sensed on the touch screen. The user gesture may include a touch by a finger or a tool, recognition of a motion of a human body, and so forth.

In the mobile terminal illustrated in FIG. 4, the remote control application described in the embodiment illustrated in FIG. 2A is installed in the ROM 210-2 or the storage 258, and upon execution of the remote control application, a control command for controlling an operation of the corresponding home device 140 according to a user's key input or touch input or a user's gesture input using an acceleration sensor or a gyro sensor is generated and delivered to the HGW 120. The control command may be sent to the HGW 120 through the communication network 130 or a communication means such as Power Line Communications (PLCs), WiFi, ZigBee, or the like.

The storage 258 stores various applications, contents, and data for use of the user device and stores operation state information of the home devices 140 provided from the HGW 120 according to remote control of the present invention and processing result information associated with the operation state information.

When voice recognition is used as in the embodiment illustrated in FIG. 2B, the remote control application includes a voice recognition function, and a user's voice command input through the microphone 250 after execution of the remote control application is sent to the controller 210. The controller 210 then performs a function of the remote control application, converts the voice command into a control command recognizable by the HGW 120, and sends the control command to the HGW 120. The control command may be configured I the form of a packet including identification information of the corresponding home device 110 and content data.

In the embodiment illustrated in FIGS. 2A and 2B, after executing an operation corresponding to the control command, the home device 140 feeds information indicating the processing result back to the HGW 120. Then, the HGW 120 transmits the information indicating the processing result (hereinafter, referred to as processing result information) to the mobile terminal 200, and the remote control application of the mobile terminal 200 provides a UI showing the processing result. The UI may be provided in various forms such as audio effects, a voice message, a text message, icon indication, animation, and so forth.

In the home network system implemented as in the foregoing embodiments, a user situated outside may monitor an in-home situation of the home device 110 through the mobile terminal 200. In this case, the user connects to the HGW 120 by using a mobile terminal 200 or computing device carried by the user, and controls at least one of the home devices 110-1 to 110-n registered through the HGW 120 to monitor the in-home situations. To this end, at least one of the home devices 110-1 to 110-n includes a digital camera capable of capturing an in-home situation in the form of a still or moving image.

In the foregoing examples, the user's control command for controlling the home devices 140 is sent to the HGW 120 through the mobile terminal 200, but the same function may also be performed using various smart devices (hereinafter, referred to as a "user device") in which the remote control application may be installed, such as a user's tablet PC, IP-based wired/wireless phone, multi-function remote controller, smart TV, or the like, as well as the mobile terminal 200. If the remote control application is provided in the form of, for example, a widget, the operation state of the home device 140 may be indicated through the widget on a real time basis, periodically, or on a request basis.

Figure 5:
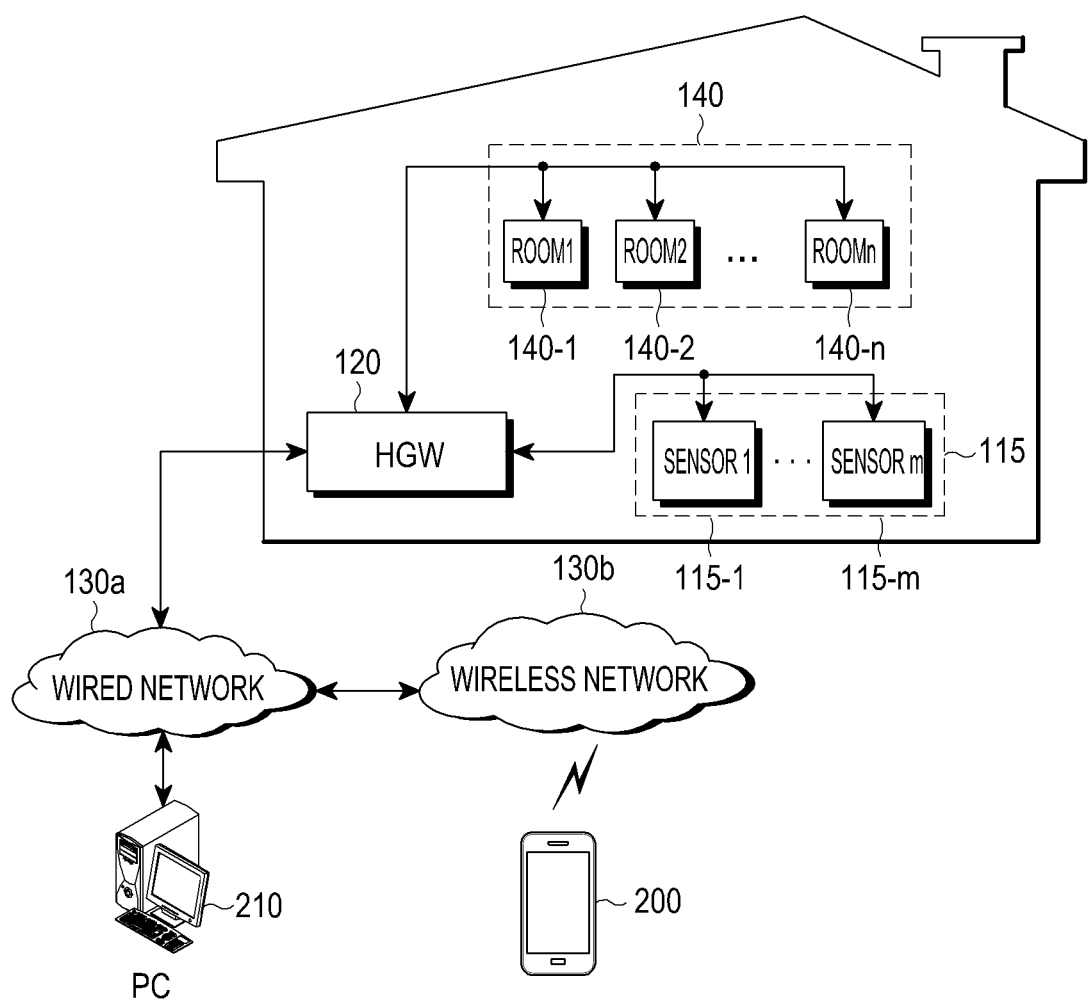
FIG. 5 is a block diagram illustrating a structure of a home network system that remotely controls an operation of a home device according to an embodiment of the present disclosure.

FIG. 5 is a schematic diagram illustrating a structure of a home network system that remotely controls an operation of a home device according to an embodiment of the present disclosure. Like components that have already been described in FIGS. 1 and 4 will not be described in detail.

In an embodiment illustrated in FIG. 5, the HGW 120 registers information of multiple devices 140 and collects operation state information corresponding to operations of the home devices 140 periodically or on a request basis to identify an operation state of each home device 140. Locations of the multiple home devices 140 are registered on an in-home room basis. In FIG. 5, reference numerals 140-1 through 140-n denote at least one home device corresponding to indicated rooms. The multiple home devices 140 of FIG. 5 correspond to the home devices 110 of FIG. 1.

The HGW 120 communicates with a user device such as the mobile terminal 200, a tablet PC, or a smart TV to provide operation state information of the home devices 140 to the user device. In the following embodiment of the present disclosure, suppose that the mobile terminal 200 is used as the user device for convenience' sake.

The operation state information transmitted to the HGW 120 from each home device 140 and the processing result information corresponding to execution of the control command may be transmitted from the home device 140 to the HGW 120 by using a communication means, for example, PLC, WiFi, ZigBee, or the like. The HGW 120 variably sets an interval of collecting the operation state information transmitted from the home devices 140. The HGW 120 stores floor plan information showing an in-home room-specific location, and registers and manages the locations of the home devices 140 on a room basis. Herein, the floor plan information may be provided from a server (not shown) of an operator establishing the home network system to the HGW 120 or may be directly input by the user to the HGW 120 using a PC 210. The floor plan information may be provided to include selectable or editable various designs of floor plans if a user's home address is input through a portable site provided by the operator. In this case, the user may select or edit a floor plan design depending on user's taste. For example, the mobile terminal 200 provides a UI to modify an in-door floor plan according to user's demands (for example, to remove a wall between rooms or increase the size of a room). The user-desired floor plan design may be selected using the portal site or through various user devices, such as the mobile terminal 200, communication-connected with the HGW 120.

The current location of each home device 140 may be directly registered in the HGW 120 or may be detected using an RF tag, sensor, or the like provided in each home device 140. The location information of each home devices 140 is mapped to a name of a room where the home device 140 is placed, for example, a kitchen for a refrigerator, a living room for a TV, or the like. The location information may have a location in which each home device 140 is generally installed, as a default value. By using a UI on the in-home floor plan displayed on the mobile terminal 200, the user may also drag and drop an icon of each home device 140 from one room to another room or change a room-specific or in-room location of the home device 140 on the floor plan using a gesture like a touch or a voice command.

The mobile terminal 200 may receive room-specific location information of the home devices 140 and the floor plan information from the HGW 120 and provide a UI that visually displays an in-home operation state or control command processing result, a room-specific operation state or control command processing result, or a home-device-specific operation state or control command processing result of the home devices 140 on the in-home floor plan. The operation state or control command processing result may be indicated by an icon varying with an operation state on the UI.

The voice recognition sensor 115 in FIG. 5 may be installed to correspond to, for example, the home device 140 of each room. A user's voice command recognized by the voice recognition sensor 115 installed in a particular room may be limited to be applied as a control command for controlling an operation of the home device 140 in the room through the HGW 120. In another embodiment, when the voice recognition sensor 115 and the home device 140 are located in different rooms, a control command corresponding to a voice command may be applied to the home device 140.

The HGW 120 calculates a consumption fee based on the power consumption of the home devices 140 and the power unit-price information to provide consumption fee information. The HGW 120, upon receiving a consumption fee information request from the mobile terminal 200, transmits calculated consumption fee information to the mobile terminal 200. Upon receiving the consumption fee information, the mobile terminal 200 configures, for example, a bill layout, and displays a consumption fee in the configured bill layout.

In the home network system illustrated in FIG. 5, the HGW 120 registers information of the home devices 140 installed in home, and controls and manages the registered home devices 140. For example, if a new home device is installed, the HGW 120 collects and stores information about the new home device, for example, an identifier, capacity information, and operation state information of the home device. The information about the home device may be obtained directly from the home device through a service discovery procedure between the HGW 120 and the home device, may be received by the HGW 120 from a server on the Internet based on identification information provided from the home device, or may be directly input to the HGW 120 by the user or a system administrator. If the user purchases and installs the new home device, and inputs identification information, for example, a serial number, a model number, or a Quick Response (QR) code, provided from the home device or a manual thereof into the HGW 120, then the HGW 120 may connect to a manufacturer server on the Internet based on the identification information of the home device and obtain the information about the home device.

Figure 6:
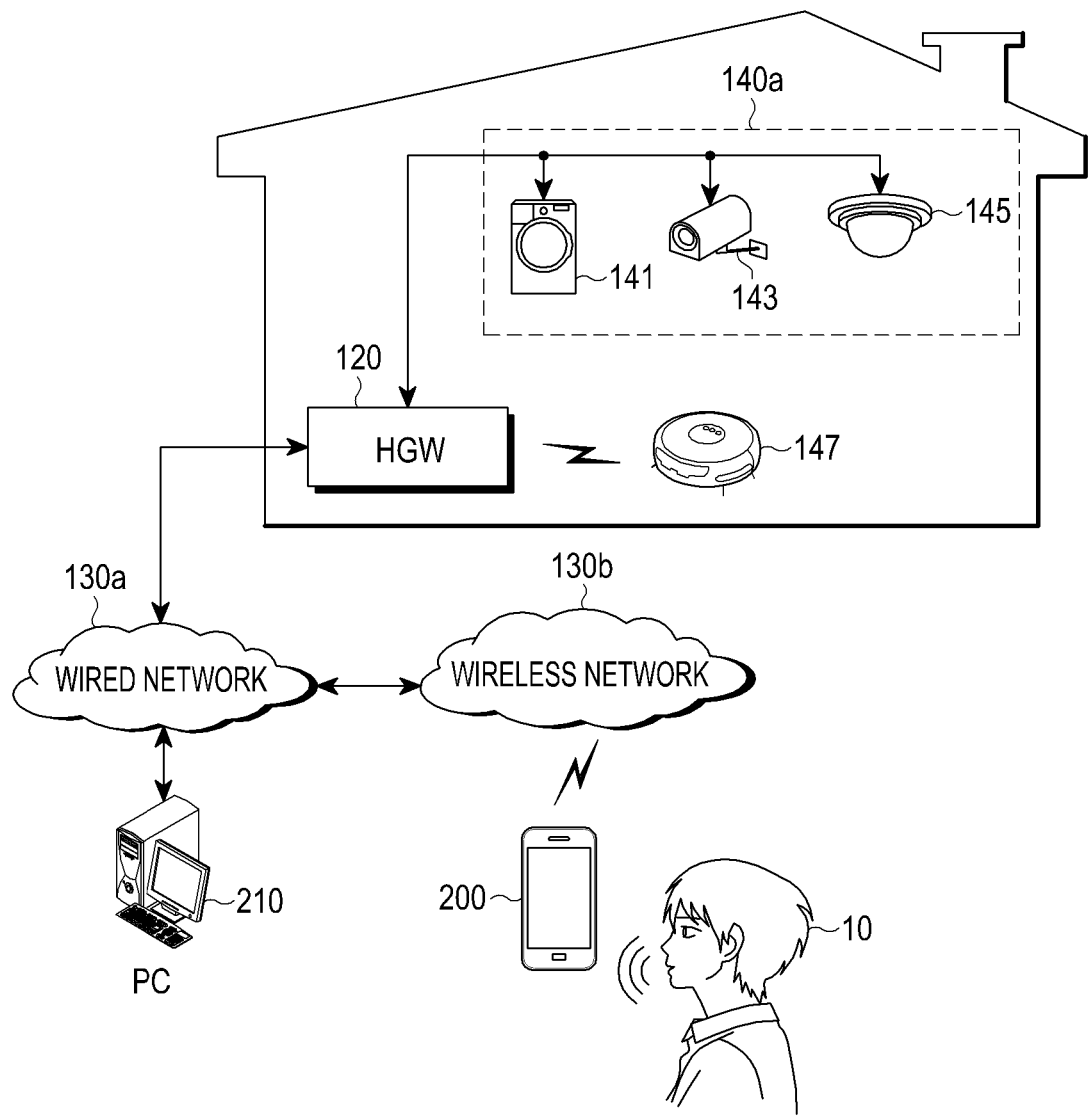
FIG. 6 is a block diagram illustrating a structure of a home network system that recognizes a voice command to remotely control an operation of a home device according to an embodiment of the present disclosure.

FIG. 6 is a block diagram illustrating a structure of a home network system that recognizes a voice command and remotely controls an operation of the home device according to an embodiment of the present disclosure, in which a voice command is input through the mobile terminal 200 to control an operation of a laundry machine located in a room (for example, a laundry room) and control an operation of a robot vacuum cleaner located in another room (for example, a living room).

In FIG. 6, it is assumed that a laundry machine 141, a Closed Circuit TV (CCTV) 143, and an electric lamp 145 are installed as fixed home devices 140a in a room (for example, the laundry room). The fixed home devices 140a may be connected with the HGW 120 through a wired interface or may be connected with the HGW 120 through a wireless interface. It is also assumed that a robot vacuum cleaner 147 having a moving function is located as a mobile home device in another room (for example, the living room). The robot vacuum cleaner 147 may be connected with the HGW 120 through the wireless interface.

In an example of FIG. 6, the voice command of the user 10 for controlling the operation of the laundry machine 141 is generated as a control command and delivered to the HGW 120 through the mobile terminal 200, and the HGW 200 controls the operation of the laundry machine 141 according to the control command. Likewise, the operation of the robot vacuum machine 147 may also be controlled.

In the example of FIG. 6, if the user 10 desires to check the operation state of the laundry machine 141 through the mobile terminal 200, the user 10 may turn on the CCTV 143 and the light lamp 145 together in the same manner and may receive image information including the operation state of the laundry machine 141, which is output through the CCTV 143, through the mobile terminal 200.

Figure 7:
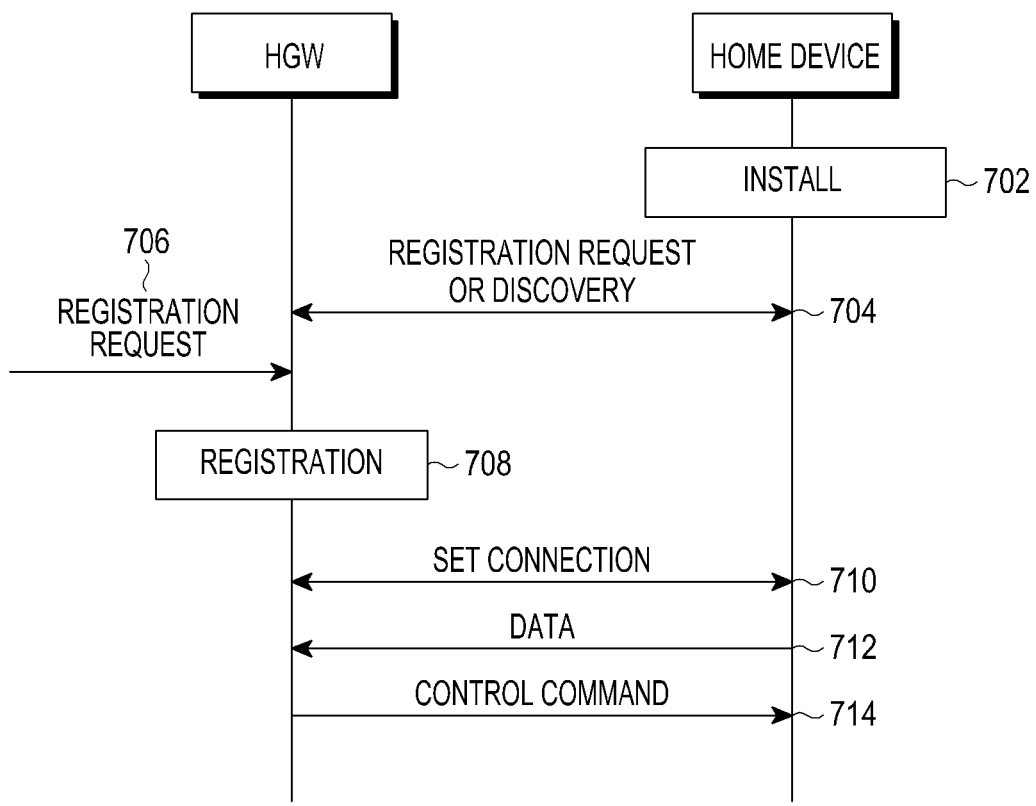
FIG. 7 is a ladder diagram illustrating a procedure for registering a home device according to an embodiment of the present disclosure.

FIG. 7 is a ladder diagram illustrating a procedure for registering a home device according to an embodiment of the present disclosure.

Referring to FIG. 7, in step 701, the home device 140 is installed and an operating power is supplied. The user determines to register the already installed home device 140 in the HGW 120. In step 703, the HGW 120 performs a discovery procedure for the home device 140. For example, if the home device 140 is connected to the HGW 120 through WiFi, the HGW 120 performs a discovery procedure for a neighboring new home device periodically or at the request of the user. If the home device 140 is discovered through the discovery procedure, the HGW 120 receives home device information from the home device 140. The home device information may include at least one of identification information and capacity information of the home device 140. In a selectable embodiment, the identification information may include a product code indicating a product type (an air conditioner, a refrigerator, a Light Emitting Diode (LED) lamp, or the like) of the home device 140.

In a selectable embodiment, in step 705, the HGW 120 receives a registration request for the home device 140 to be registered from the user through a UI of the HGW 120, a control console connected by an external interface, or a computer on the Internet, and receives information about the home device 140 from the user. In another embodiment, the HGW 120 obtains identification information of the home device 140 from the home device 140 or the user, and connects to a manufacturer server of the home device 140 based on the identification information to obtain capacity information of the home device 140.

In step 707, the HGW 120 stores the information about the home device 140 and manages the home device 140 as the registered home device 140. In a selectable embodiment, the HGW 20 may receive additional information about the home device 140 from the user or from a remote terminal through the Internet or WiFi. The additional information may include at least one of, for example, a name or nickname of the home device 140 and a location where the home device 140 is installed.

In a selectable embodiment, the HGW 120 may receive additional information about an operation mode and/or an authority of the home device 140 directly from the user, or from the remote terminal through the Internet or WiFi. The additional information may include, for example, a level of an access authority for the home device 140. The level of the access authority may include, for example, permission for an access through the HGW 120, permission for an access by a registered remote terminal, or permission for an access to the HGW 120 by a registered remote terminal.

In step 709, the HGW 120 sets connection with the home device 140. Setting the connection is performed in a procedure determined based on WiFi, ZigBee, Bluetooth®, NFC, or a wired communication, depending on a communication method between the HGW 120 and the home device 140. Once connection is set between the HGW 120 and the home device 140, the home device 140 transmits data to the HGW 120 through the set connection in step 711. In an embodiment, the home device 140 transmits operation state information to the HGW 120 periodically or at the request of the HGW 120.

In step 713, the HGW 20 sends a control command to the home device 140. The control command may be delivered to the home device 140 from the mobile terminal 200 through the HGW 120 as in an embodiment of the present disclosure. In a selectable embodiment, the control command may be set to be suitable for characteristics of each product, taking a product type of the home device 140 into account. The control command may set a current operating condition to be maintained or an operating condition to be changed stepwise. The control command may be set in common to the multiple home devices 140, or different control commands may be set for the multiple home devices 140. The control command is transmitted to the HGW 120 from the user device through a user's key input or touch input like a gesture or a user's voice command, and the HGW 120 transmits the received control command to the home device 140.

Figure 8:
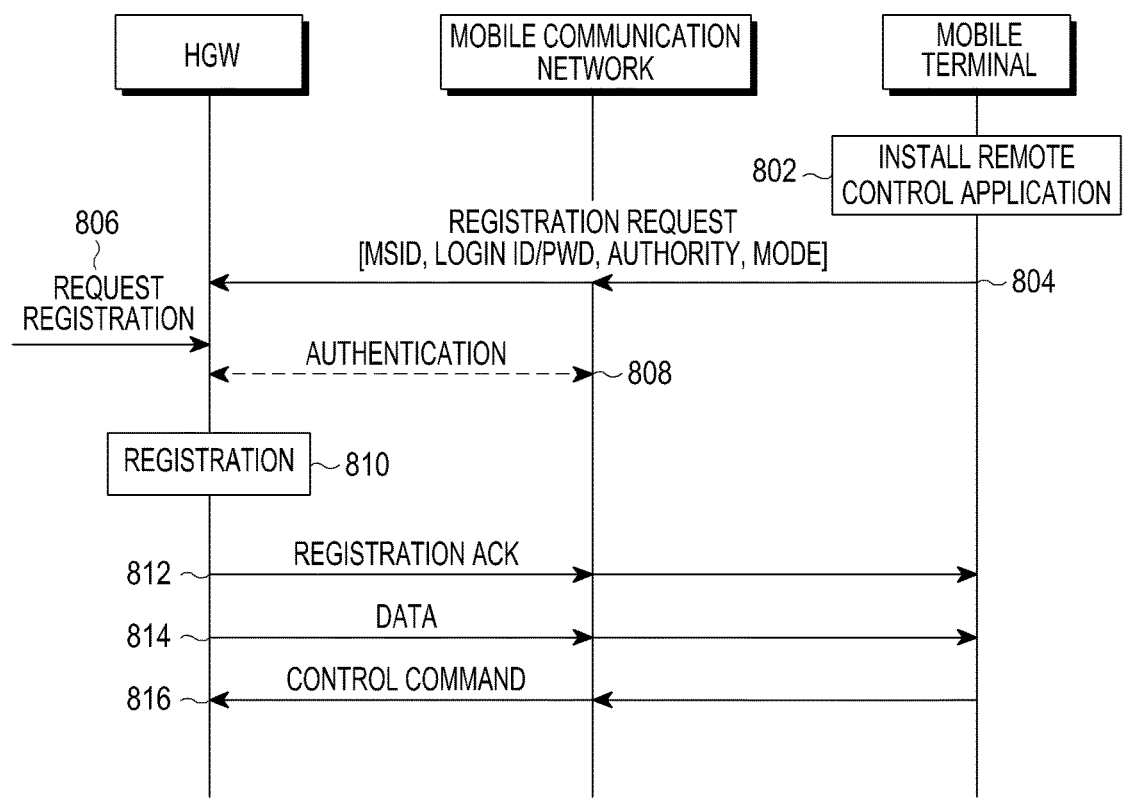
FIG. 8 is a ladder diagram illustrating a procedure for registering a mobile terminal according to an embodiment of the present disclosure.

FIG. 8 is a ladder diagram illustrating a procedure for registering a mobile terminal according to an embodiment of the present disclosure.

Referring to FIG. 8, in step 801, the mobile terminal 200 installs a remote control application that supports remote control of the HGW 120. In a selectable embodiment, the remote control application may be installed only in the mobile terminal 200 of the user having passed through a predetermined authentication procedure. In an embodiment, the HGW 120 provides an authentication number, and the HGW 120, a manufacturer's server that manages the HGW 120, or an external server that provides the remote control application permits downloading of the remote control application only by the mobile terminal 200 of the user inputting the authentication number.

In a selectable embodiment, the remote control application may provide a limited function according to a permitted authority level of the mobile terminal 200. For example, the remote control application may selectively provide at least one of information inquiry through the HGW 120, reception of alarm information from the HGW 120, and partial or entire control of the home devices 140, depending on the permitted authority level. The permitted authority level may be set through the HGW 120, the manufacturer server that manages the HGW 120, or the external server that provides the remote control application.

In step 803, the mobile terminal 200 executes the remote control application and sends a registration request message to the HGW 120 through the remote control application. The remote control application may be delivered to the HGW 120 through the Internet, or to the HGW 120 through WiFi. The registration request message may include at least one of an identifier of the mobile terminal 200 (for example, an MS Identifier (MSID) or an International Mobile Subscriber Identify (IMSI)), login ID and password, authority information, and operation mode information.

In a selectable embodiment, in step 805, the HGW 120 receives the registration request for the mobile terminal 200 to be registered from the user through the UI of the HGW 120, a control console connected by an external interface, or a computer on the Internet, and receives information about the mobile terminal 200, for example, authority information and/or operation mode information, from the user.

In a selectable embodiment, in step 809, the HGW 120 connects to a server that manages subscriber information of a mobile communication system based on the identification information obtained from the mobile terminal 200 or the identification information of the mobile terminal 200 obtained from the user to authenticate the mobile terminal 200. If the authority information of the mobile terminal 200 is not input to the HGW 120, the HGW 120 may generate the authority information of the mobile terminal 200 based on a result of the authentication.

In step 811, the HGW 120 stores the information about the mobile terminal 200 and manages the mobile terminal 200 as the registered mobile terminal 200. In step 813, the HGW 120 sends a registration acknowledgement message indicating that the information about the mobile terminal 200 has been successfully registered to the mobile terminal 200. In step 813, the HGW 120 may also transmit data needed for remote control of the home devices 140 to the mobile terminal 200. The needed data may include, for example, operation state information of the home devices 140.

In step 815, the user of the mobile terminal 200 having received the operation state information may send a control command for controlling an operation of the home device 140 to the HGW 120 by using a UI provided through the remote control application. The control command corresponding to the energy saving mode is sent to the HGW 120 from the mobile terminal 200 illustrated in FIG. 4 through a user's key input or touch input such as a gesture or a user's voice command, and the HGW 120 delivers the received control command to the home device 140. Although not shown, processing result information of the home device 140 that has performed a corresponding operation according to the control command may be provided as feedback information to the mobile terminal 200.

Figure 9:
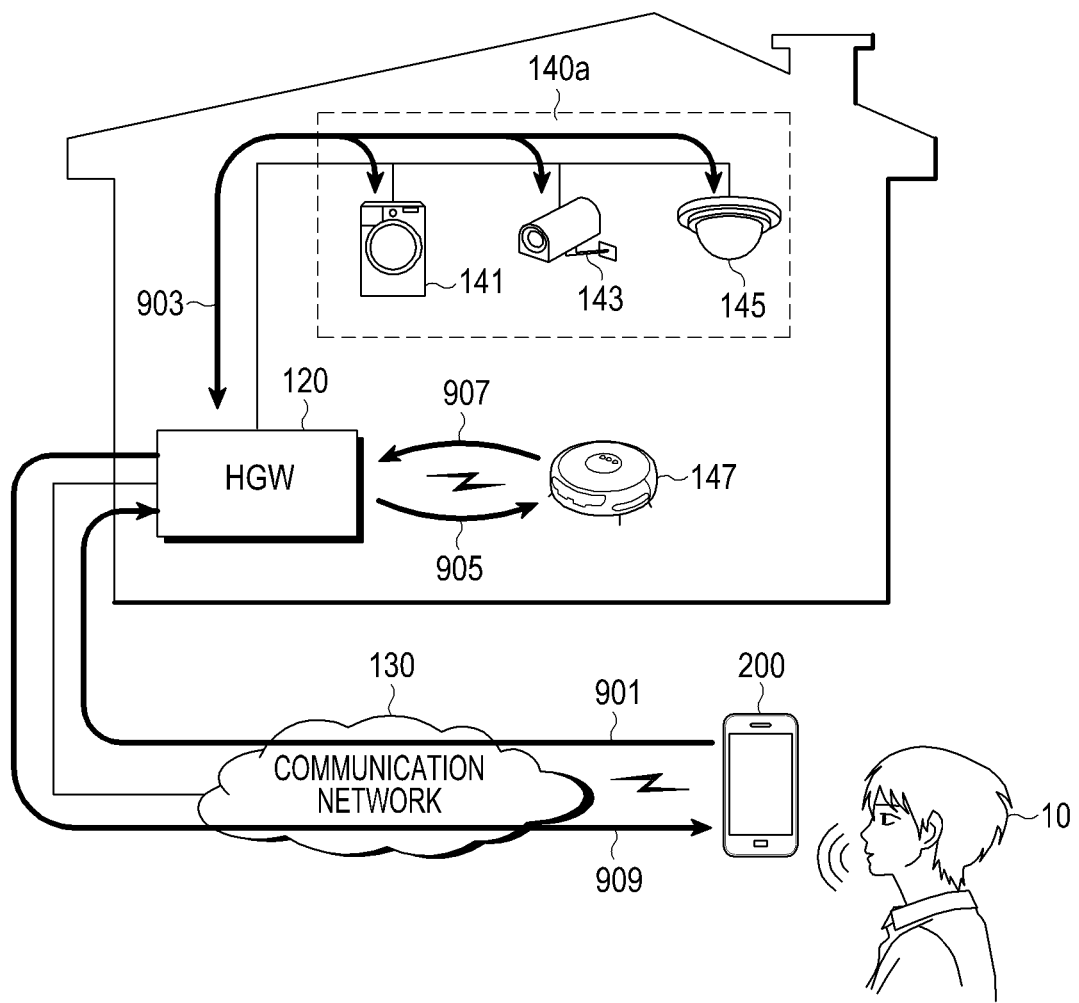
FIG. 9 is a diagram illustrating determining remote control procedure executed in a home network system according to an embodiment of the present disclosure.

FIG. 9 is a diagram illustrating a remote control procedure executed in a home network system according to an embodiment of the present disclosure.

In an embodiment illustrated in FIG. 9, suppose that the mobile terminal 200 is used as a user device and the operations of the home devices 140a located in the laundry room and the operation of the robot vacuum cleaner 147 located in the living room among home devices are controlled through a voice command as in the example of FIG. 6.

Figure 10A:
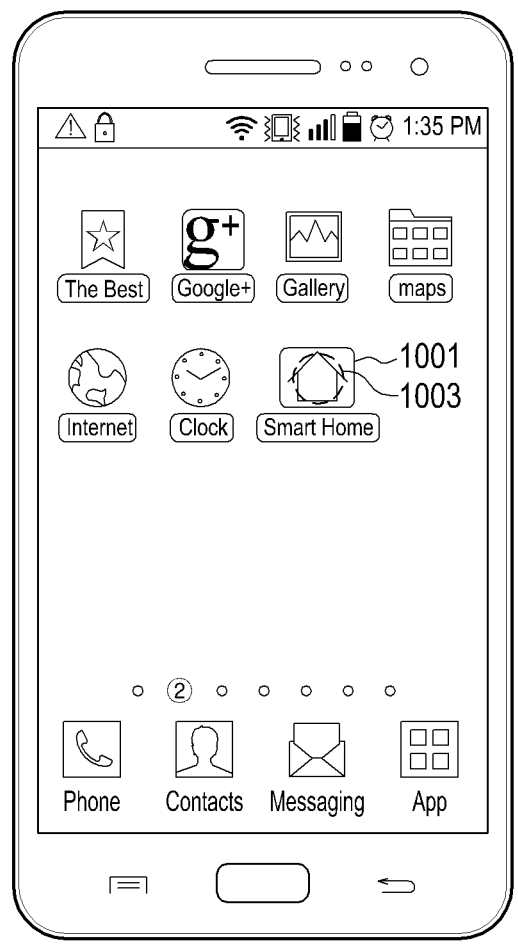
FIGS. 10A to 12 are diagrams illustrating various examples of a User Interface (UI) screen displayed on a mobile terminal in execution of remote control according to an embodiment of the present disclosure.

Referring to FIG. 9, in step 901, if the user 10 desires to operate the in-home laundry machine 141 from a remote place, a remote control application for remote control of the home device is executed in the mobile terminal 200. To this end, as illustrated in FIG. 10A, the mobile terminal 200 provides an icon 1001 for executing the installed remote control application and executes the remote control application if sensing a user gesture 1003, for example, a touch on the icon 1001. In another example, the remote control application may also be executed through voice.

Figure 10B:
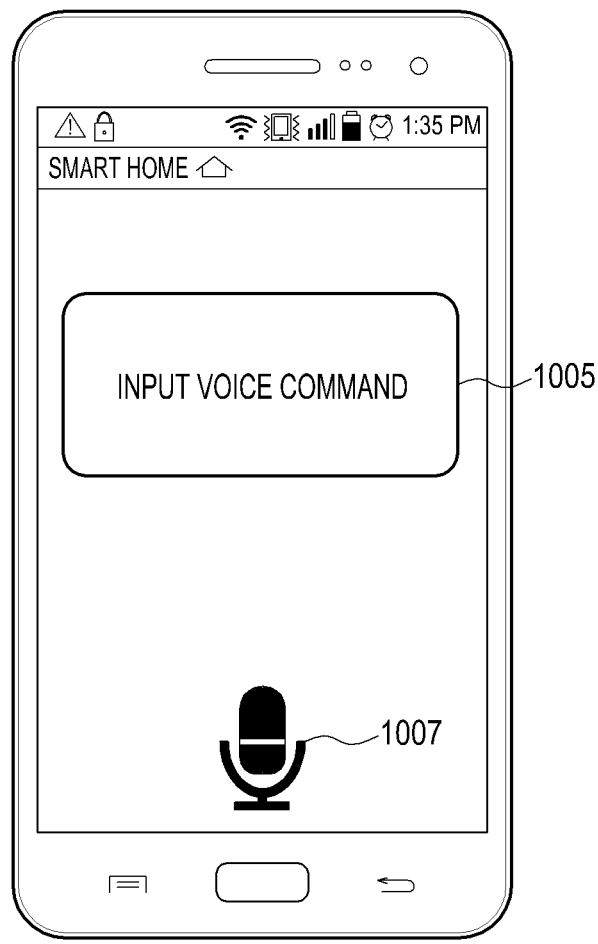

Upon execution of the remote control application, the mobile terminal 200 provides a guide message 1005 and an icon 1007 for input of a voice command as illustrated in FIG. 10B, and if a user's voice command, for example, "Operate the laundry machine" or "Start laundry", is input, the voice command of the user 10 is generated as a control command in the form of a packet including identification information of the laundry machine 141, control details corresponding to a laundry machine operating command, and user authentication information, through the mobile terminal 200 and delivers to the HGW 120 through the communication network 130.

In step 903, the HGW 120 having received the control command determines that the user 10 is an authorized user based on the user authentication information, and determines that a control target home device is the laundry machine 141 based on the identification information. The HGW 120 then sends a control command for starting laundry to the laundry machine 141. If the laundry machine 141 is in a power-off state, the HGW 120 sends a control command for first turning on the laundry machine 141 and then starting laundry. Operation state information of the laundry machine 141 may be delivered to the HGW 120 periodically or at the request, and the operation state information may be provided to the mobile terminal 200 in step 909. Thus, laundry progress such as start laundry=>during a laundry cycle=>during a spin-dry cycle=>during a dry cycle, and so forth, may be checked in real time through the mobile terminal 200. As above, the HGW 120 having received the control command may check a power on/off state and an operation state of a corresponding home device.

In another embodiment, if determining that the home device is in a state of being unable to perform the user's control command or is in a malfunction state, the HGW 120 stops execution of the control command and sends a message indicating the unable state or malfunction state of the home device to the mobile terminal 200.

If the user 10 inputs a voice command, for example, "Operate the laundry machine" or "Clean", through the remote control application during operation of the laundry machine 141 in step 901, then the voice command of the user 10 is generated as a control command in the form of a packet including identification of the robot vacuum cleaner 147, control details corresponding to a cleaner operation command, and user authentication information through the mobile terminal 200 and delivered to the HGW 120 through the communication network 130.

In step 905, the HGW 120 sends a control command for instructing the robot vacuum cleaner 147 located in another room (for example, the living room) to start cleaning in the same manner as in control of the operation of the laundry machine of step 903. Likewise, the operation state information of the robot vacuum cleaner 147 may be delivered to the HGW 120 periodically or at the request, and the operation state information may be provided to the mobile terminal 200 in step 909. Upon completing execution of the control commands, the laundry machine 141 and the robot vacuum cleaner 147 transmit respective processing result information to the HGW 120 which then transmits the received processing result information to the mobile terminal 200.

In another embodiment, when desiring to select a control target home device or check overall operation states of home devices in home in step 901, the user 10 may request the HGW 120 to transmit in-home floor plan information including operation state information of the home devices.

Figure 11:
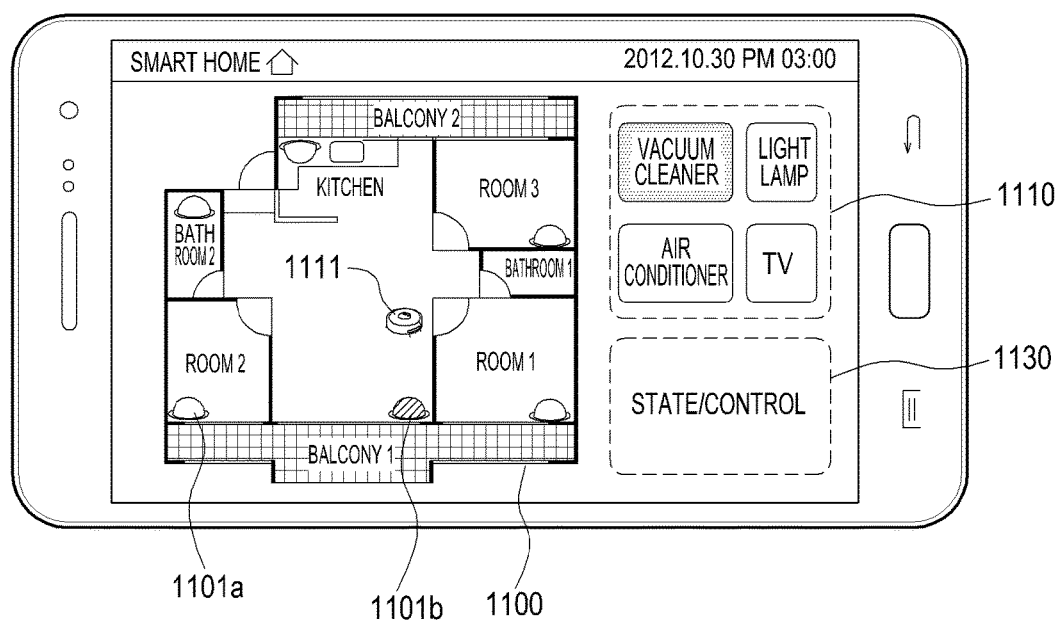

FIG. 11 is a diagram illustrating an example of floor plan information transmitted to a mobile terminal in a home network system according to an embodiment of the present disclosure, and in FIG. 11, it is assumed that a robot vacuum cleaner among home devices in home operates according to the procedure illustrated in FIG. 9.

Referring to FIG. 11, an in-home floor pan 1100 displayed on the mobile terminal 200 may include icons 1101a and 1101b indicating whether home devices are in operation on a room basis. As in an example illustrated in FIG. 11, if a robot vacuum cleaner 111 is in operation, the icon 1101b in a corresponding room (Living Room) and icons 1101a in other rooms (Room 1, Room 2, Room 3, Kitchen, and so forth) are indicated in different forms or in different colors. If the user touches a region of the room (Living Room) or inputs a voice command such as "Show me the operation state of the living room", then operation states of multiple home devices (for example, the vacuum cleaner, the light lamp, the air conditioner, and the TV) located in the corresponding room (the living room) are displayed in different forms or in different colors as shown on a display window 1110. In FIG. 11, the robot vacuum cleaner 1111 is in operation, such that "Vacuum Cleaner" is displayed differently from the other home devices (the light lamp, the air conditioner, and the TV) on the display window 1110. On another display window 1130, operation state information of the robot vacuum cleaner 1111, received from the HGW 120, is displayed. Although the operation of the home device has been described as an example for convenience' sake in the foregoing embodiment, detailed/stepwise operation control or movement (for a mobile home device) may also be possible through detailed designation of the control command.

Figure 12:
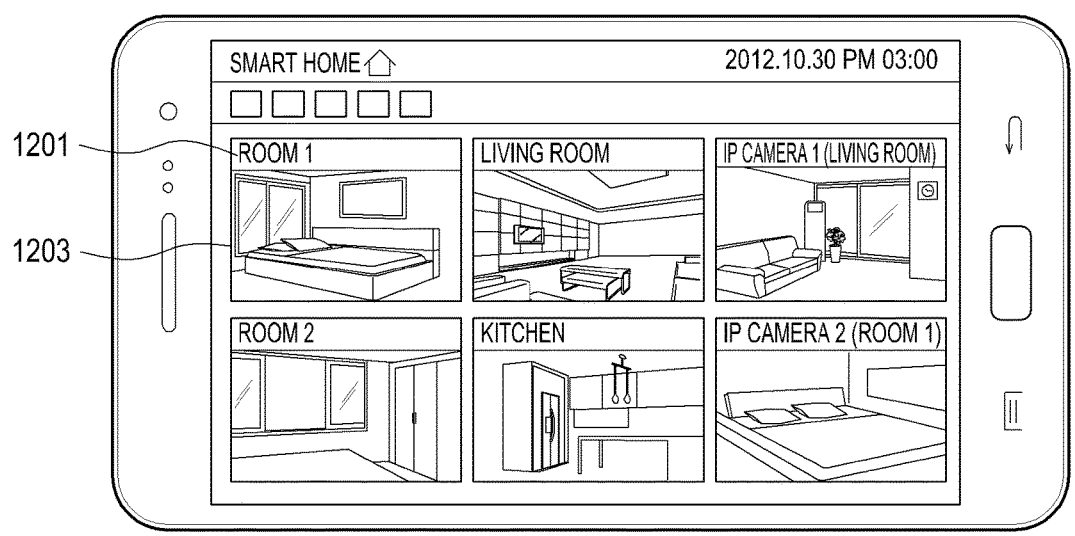

In another embodiment, the mobile terminal 200 of the user may send a request to the HGW 120 to receive operation states of home devices in the form of video or still images through at least one CCTV (hereinafter, referred to as a camera) installed in home, for example, on a room basis. In this case, the mobile terminal 200 sends a home monitoring request message to the HGW 120. In response to the request message, the HGW 120 controls at least one home device including the camera to collect image data and transmits video information collected on a room basis to the mobile terminal 200. In an example of FIG. 12, suppose that a camera is installed in each room. A room-basis image shows a room name 1201 and an in-room captured image 1203 as illustrated in FIG. 12.

Hereinafter, a procedure for remotely controlling a home device according to an embodiment of the present disclosure will be described with reference to FIGS. 13 to 15.

In FIGS. 13 to 16, one home device 140 is illustrated for convenience' sake, but in practice, multiple home devices 140 are connected with the HGW 120. Also, a description will be made using an example of the mobile terminal 200 as a user device that is a smart device for remote control.

Figure 13:
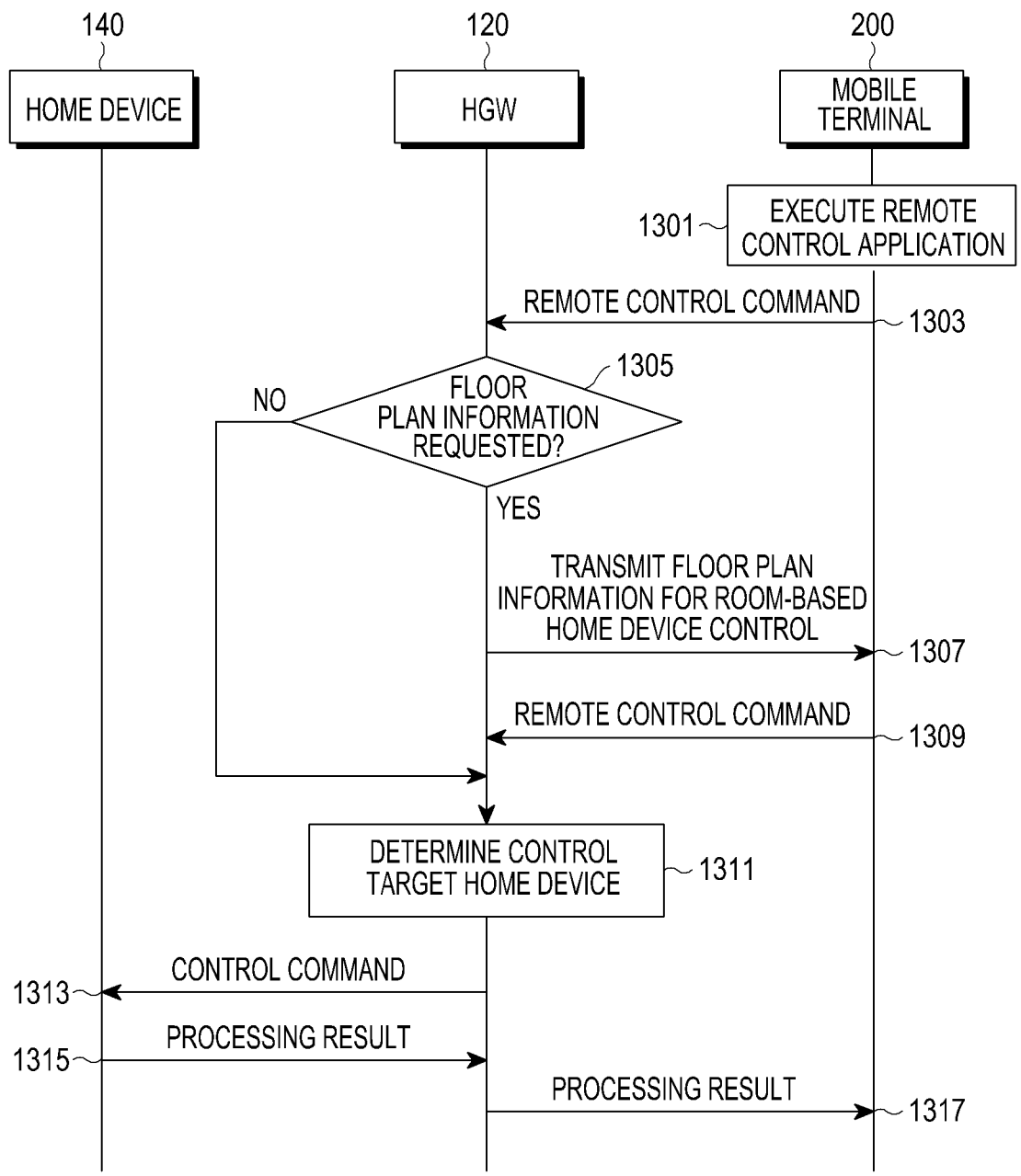
FIG. 13 is a ladder diagram illustrating a remote control procedure executed in a home network system according to an embodiment of the present disclosure.

FIG. 13 is a ladder diagram illustrating determining remote control procedure executed in a home network system according to an embodiment of the present disclosure. Although now illustrated, the HGW 120 may receive operation state information from the home device 140 in home periodically or at the request, and the HGW 120 is assumed to confirm the operation state of the home device 140 based on the received operation state information.

In step 1301 illustrated in FIG. 13, when the user desires to operate the home device 140 from a remote place, the user executes a remote control application for remote control of the home device in the mobile terminal 200 through a touch input, gesture, or voice command. Once the remote control application is executed, in step 1303, the mobile terminal 200 sends a control command to the HGW 120 in the manner described in the embodiment illustrated in FIGS. 10A and 10B. The control command in step 1303 may be, for example, a control command for controlling an operation of the home device 140 or a control command for requesting transmission of the floor plan information.

In step 1305, the HGW 120 determines whether the control command received from the mobile terminal 200 is a control command for requesting the floor plan information or a control command for controlling the operation of the home device 140. If determining that the received control command is the control command for requesting the floor plan information, the HGW 120 transmits the floor plan information for controlling a home device on a room basis as illustrated in FIG. 11 to the mobile terminal 200, in step 1307. In step 1309, if the user having confirmed the floor plan information inputs/selects a control target home device 140 and control details through the mobile terminal 200, the mobile terminal 200 generates a control command including the control details, identification information of the control target home device 140, and user authentication information, and sends the control command to the HGW 120.

If determining that the received control command is the control command for controlling the operation of the home device 140 in step 1305, the HGW 120 skips step 1307. An information configuration of the received control command is the same as the control command received in step 1309. In step 1311, the HGW 120 identifies identification information included in the control command to determine the target control home device 140, and the HGW 120 sends the control command including the control details to the home device 140 in step 1313. When the control target home device 140 is selected, a home device in an unable state or a malfunction state (for example, the home device having a malfunction possibility because of using a rated power exceeding a reference value or having an operating temperature exceeding a reference value, that is, having a value indicating an operation state, which exceeds a reference value) may be excluded from the target control home device 140, even if receiving the control command for controlling the operation from the mobile terminal 200. The home device 140 having received the control command executes an operation corresponding to the control details, and transmits processing result information corresponding to the execution of the operation to the HGW 120 in step 1315.

In step 1317, the HGW 120 transmits the processing result information to the mobile terminal 200 which then provides the processing result through a UI provided in the remote control application.

<Table 1> and <Table 2> show examples of various control modes and control schemes that may be executed in the HGW 120 through the control command according to an embodiment of the present disclosure.

TABLE 1

| Control Mode | Auto Mode | Comprehensively control energy consumption of all home devices in home (Ex. an out mode, a warm-up mode, a saving mode, and the like) |
|---|---|---|
| | Room-Specific Auto Mode | On/off-control a user-selected room |
| | Home-Device-Specific Saving Mode | Control each user-selected home device |
| | Artificial Intelligence Mode | Comprehensively determine temperature, luminous intensity, presence of a person in a room for collective artificial-intelligence control |

TABLE 2

| Control Mode | Power off | Ex.) Power off a home device and switch an operation of the home device into a sleep mode |
|---|---|---|
| | Power on | Ex.) Power on a home device and perform detailed control of the home device such as raising the set temperature of an air conditioner, lowering the set temperature of an electric heater, and adjusting the brightness of a light lamp |
| | Detailed control | Ex.) Detailed control, such as adjusting the brightness of a light lamp, recording a channel or a program of a TV, adjusting a laundry mode during an operation of a laundry machine, adjusting a temperature of an air conditioner, and the like |

An information configuration of the processing result information delivered from the home device 140 to the HGW 120 in step 1315 is as shown in <Table 3>.

TABLE 3

| Processing Result Information | Identification Information | Identification information of a control target home device (for example, a serial number) |
|---|---|---|
| | Processing Result | State information of a home device after execution of an operation Ex.) an on/off state, a temperature setting state, a light brightness level, and so forth |
| | Safety Control | Included in case of occurrence of an abnormal state Ex.) over-current, over-power, high-temperature, dust state, and so forth |

An information configuration transmitted from the HGW 120 to the mobile terminal 200 in step 1317 may be the same as that shown in <Table 3>, or the identification information may be used as, for example, unique identification information determined by the HGW 120. The unique identification information may include information identifying at least one of the HGW 120 and the home device 140. The mobile terminal 200 may display the processing result information in step 1317, for example, in a manner shown in <Table 4>.

TABLE 4

| Processing Result Display | Screen Configuration | Display an icon and a processing result of a home device, Re-instruct execution of a control command in case of a failure in execution of the control command, and the like |
|---|---|---|
| | Processing Result | Animation effects and audio effects corresponding to control details Ex.) Change the brightness of an icon for light lamp control, apply animation effects to the speed or amount of wind for air conditioner control, and reproduce sound generated in a turbo mode of an actual air conditioner in case of turbo-mode driving of the air conditioner |
| | Integration with CCTV | Display a control command processing result as a small screen on a room-specific CCTV image |

Figure 14:
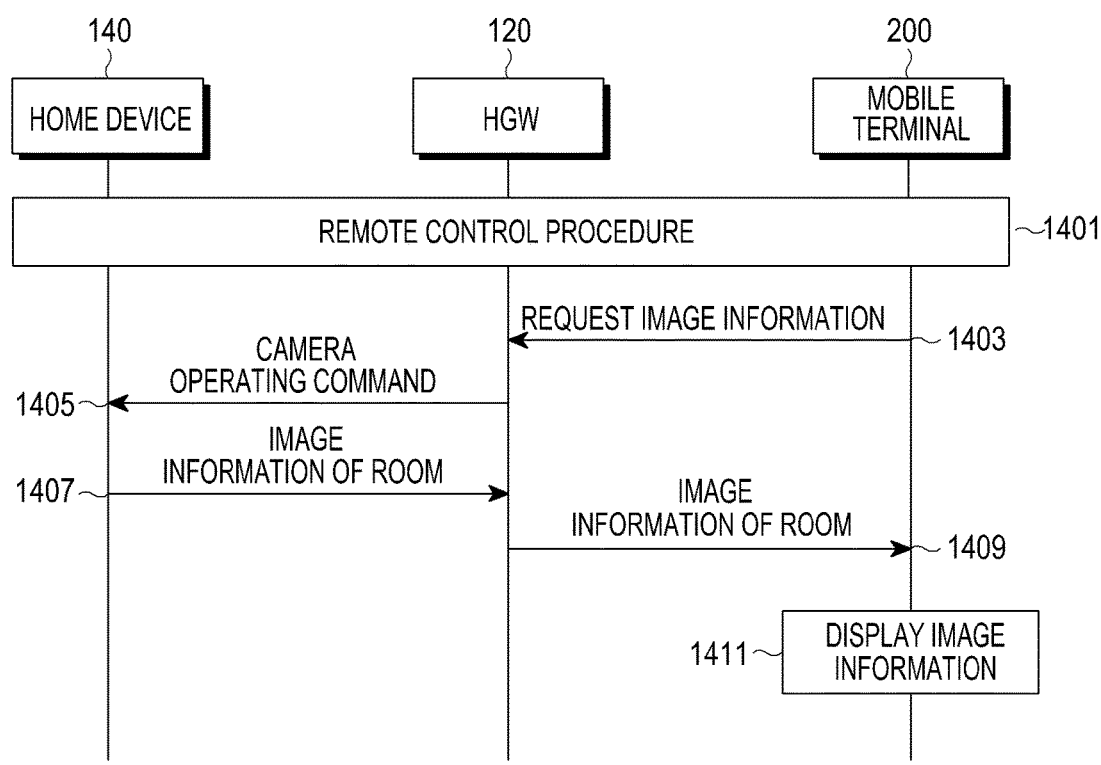
FIG. 14 is a ladder diagram illustrating a procedure for providing an operation state of a home device in the form of video information in execution of remote control in a home network system according to an embodiment of the present disclosure.

FIG. 14 is a ladder diagram illustrating a procedure for providing an operation state of a home device in the form of video information in execution of remote control in a home network system according to an embodiment of the present disclosure.

In FIG. 14, an operation in step 1401 is assumed to be the same as the remote control procedure of FIG. 13. However, in an embodiment of FIG. 14, processing result information transmission of step 1317 of FIG. 13 may be selectively performed.

Referring to FIG. 14, in step 1403, the mobile terminal 200 sends a message requesting transmission of image information of a room in which the control target home device 140 or the corresponding home device 140 is located to the HGW 120. Then, the HGW 120 sends a camera operating command for controlling at least one home device 140 including a camera in response to the request message in step 1405, collects image data of the room in which the control target home device 140 or the corresponding home device 140 is located in step 1407, and transmits the image information including the image data collected on a home-device basis or on a room basis in step 1409.

In step 1411, the mobile terminal 200 displays the received image information, for example, as in the example of FIG. 12.

Figure 15:
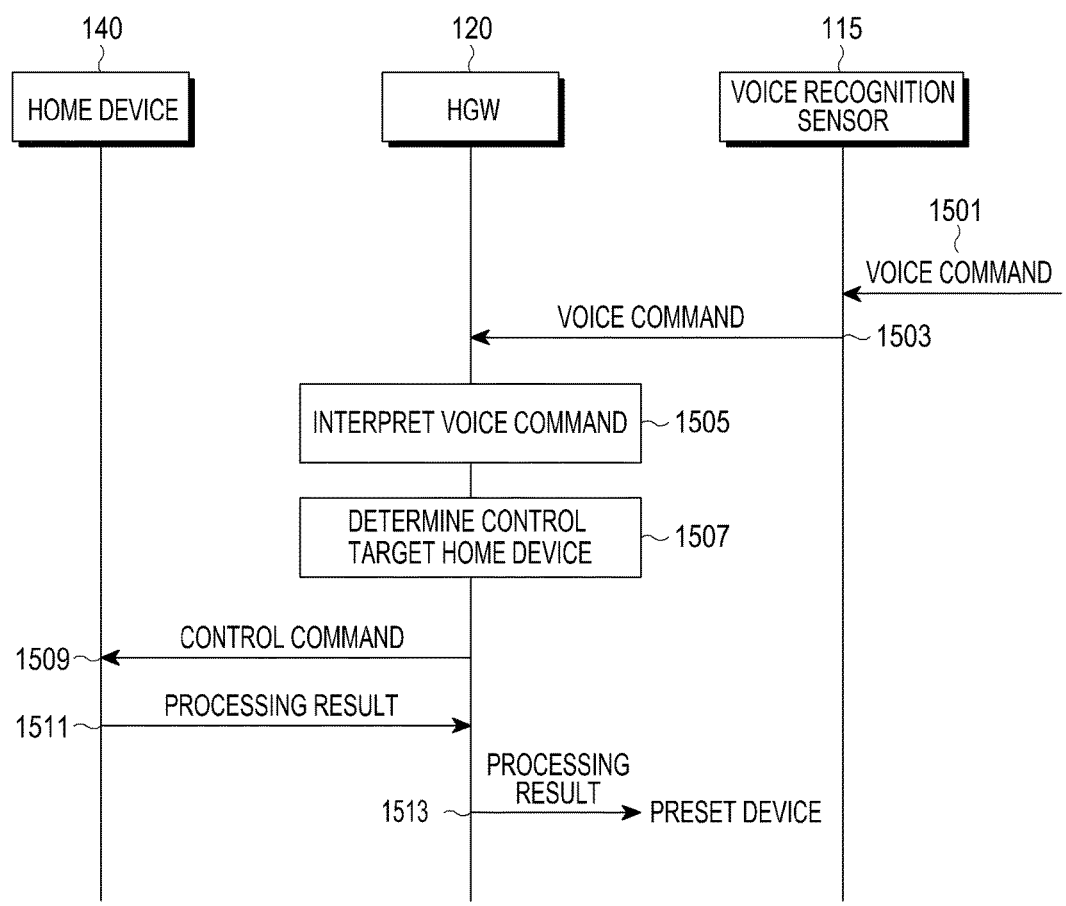
FIG. 15 is a ladder diagram illustrating a remote control procedure executed in a home network system according to an embodiment of the present disclosure.

FIG. 15 is a ladder diagram illustrating a remote control procedure executed in a home network system according to an embodiment of the present disclosure, in which the remote control procedure is executed using the voice recognition sensor 115 installed in home as in the embodiments of FIGS. 2B and 5.

Referring to FIG. 15, the in-home voice recognition sensor 115 recognizes a user's voice command in step 1501 and delivers the voice command to the HGW 120 in step 1503. The HGW 120 interprets the voice command using a voice recognition algorithm in step 1505, and determines a control target home device based on the interpreted voice command in step 1507. For example, if the voice command is "Start laundry", then the HGW 120 recognizes the word "laundry" and determines that the control target home device is a laundry machine, and recognizes the word "start" as control details and determines to turn on the laundry machine and to start the operation of the laundry machine.

In step 1509, the HGW 120 delivers the control command to the home device 140 based on the determination of step 1507, and the home device 140 which has executed the control command feeds processing result information back to the HGW 120. Then, in step 1513, the HGW 120 transmits the processing result information to preset user devices (for example, a smart TV, a mobile terminal, a tablet PC, and so forth). Step 1513 may be selectively performed.

Figure 16:
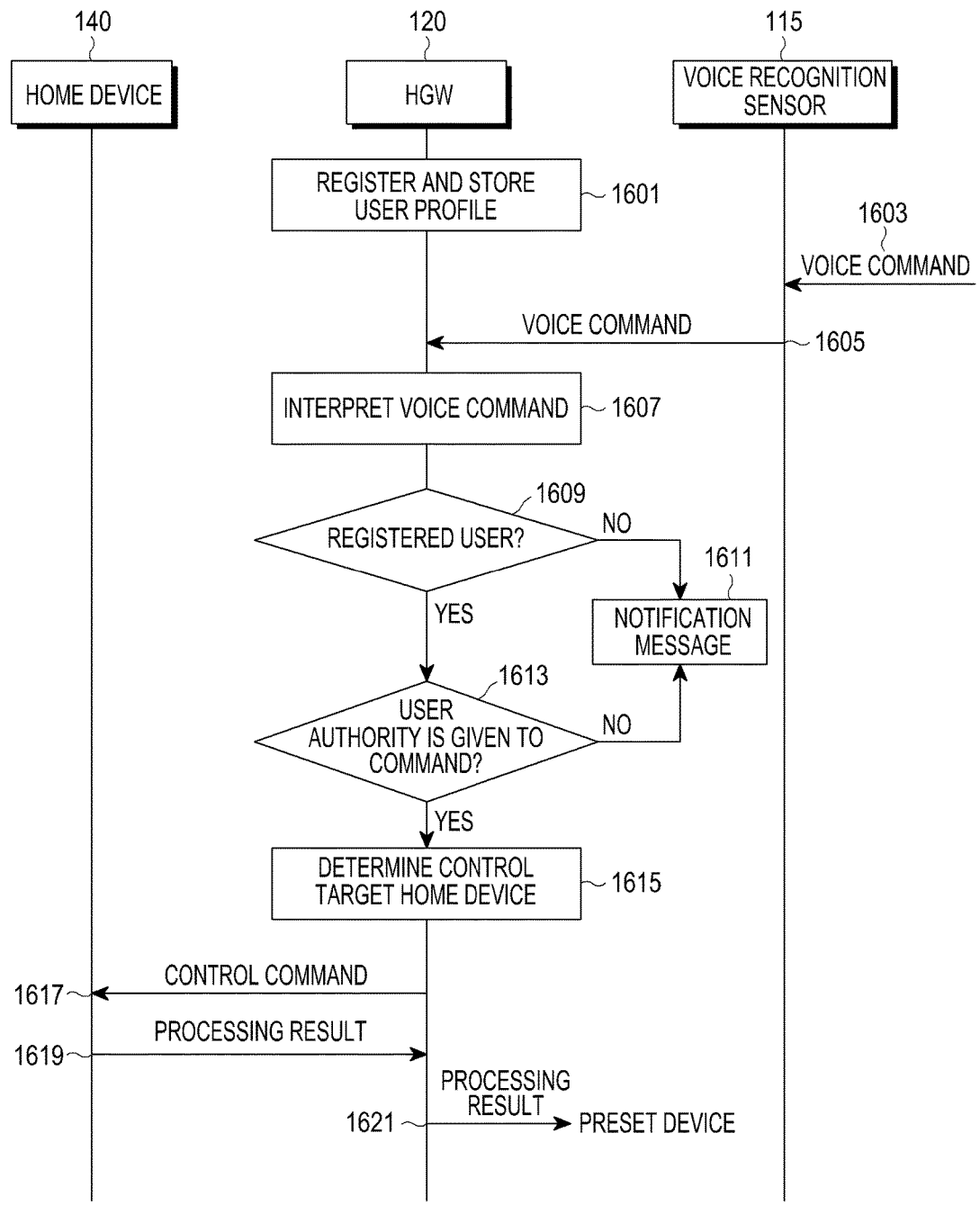
FIG. 16 is a ladder diagram illustrating a remote control procedure based on a user profile in a home network system according to an embodiment of the present disclosure.

FIG. 16 is a ladder diagram illustrating a remote control procedure based on a user profile in a home network system according to an embodiment of the present disclosure, in which the remote control procedure is executed using the voice recognition sensor 115 installed in home as in the embodiments of FIGS. 2B and 5.

Referring to FIG. 16, in step 1601, the HGW 120 receives, registers, and stores user-specific voice information for voice recognition of each user and authority information for operation control of a home device in a predetermined authority range for each user. Input of a user profile may be performed through the mobile terminal 200 of each user or the HGW 120. The user-specific voice information may be registered and stored in the HGW 120 by using the voice recognition sensor 115. When registering the user-specific voice information, the HGW 120 executes a voice command (that is, control command) of a registered user and does not execute a voice command of a non-registered user.

After the user profile for at least one user is registered and stored in step 1601, the in-home voice recognition sensor 115, if recognizing a user's voice command in step 1603, delivers the recognized voice command to the HGW 120 in step 1605. The HGW 120 interprets the voice command using a voice recognition algorithm in step 1607, and the HGW 120 determines based on the user profile whether the user inputting the voice command is a registered user in step 1609. If the HGW 120 determines that the user is not the registered user in step 1609, the HGW 120 indicates/sends a notification message indicating that the user is not the registered user in step 1611. The notification message may be in the form of a text or voice message output through the UI 128 of the HGW 120. The notification message may be sent to the mobile terminal 200 of the registered user to indicate that a non-registered user attempts control using a voice command.

If determining that the user is the registered user in step 1609, the HGW 120 determines based on the user profile whether the corresponding (voice) command is in a range of a user authority, that is, the user authority is given to the corresponding (voice) command in step 1613. If determining that the user authority is not given, the HGW 120 goes to step 1611 to indicate/send a notification message indicating that the user authority is not given to the corresponding (voice) command. In this case, likewise, the notification message may be in the form of a text or voice message output through the UI 128 of the HGW 120. If the user sends the voice command through the mobile terminal 200, the notification message may be sent to the mobile terminal 200. If determining that the user authority is given to the corresponding (voice) command in step 1613, a control target home device is determined based on the interpreted voice command in step 1615. For example, if the voice command is "Start laundry", the word "laundry" is recognized to determine that the control target home device is the laundry machine and the word "start" is recognized as control details to turn on the laundry machine and start the operation of the laundry machine. Steps 1613 and 1615 may be performed together.

In step 1619, the HGW 120 delivers the control command to the corresponding home device 140 based on the determination of step 1615, and the home device 140 having executed the control command feeds processing result information back to the HGW 120. In step 1621, the HGW 120 transmits the processing result information to preset user devices (for example, a smart TV, a mobile terminal, a tablet PC, and the like). Step 1621 may be selectively performed.

What is claimed is:

1. A remote control method in a home network system comprising at least one home device, the remote control method comprising:
   receiving, from the at least one home device, operation state information and arrangement information of the at least one home device;
   receiving, from a user device, a request for providing the operation state information and the arrangement information of the at least one home device;
   recognizing a first voice command by a user-specific voice recognition with a user profile, the user profile including a user-specific voice information and a user-specific authority information;
   generating a first control command based on the recognition of the first voice command, the first control command indicating a control target home device and an operation of the control target home device;
   transmitting, to the user device, the arrangement information and the operation state information;
   receiving, from the user device, a second control command for an operation control of the at least one home device;
   determining the control target home device based on the first control command or the second control command; and
   transmitting, to the determined control target home device, the first control command or the second control command.

2. The remote control method of claim 1, further comprising:
   receiving, from the control target home device, processing result information corresponding to execution of the first control command or the second control command; and
   transmitting, to the user device, the processing result information,
   wherein the second control command received from the user device is generated by recognizing a second voice command.

3. The remote control method of claim 1, wherein the second control command comprises at least one of identification information of the at least one home device, control details for the operation control, or authentication information of the user device.

4. The remote control method of claim 1, wherein the determining of the control target home device comprises excluding a home device, which has a malfunction possibility because a value indicating an operation state exceeds a reference value, among the at least one home device.

5. The remote control method of claim 1, wherein the arrangement information comprises floor plan information indicating a room-specific arrangement of the at least one home device.

6. The remote control method of claim 1, further comprising:
   transmitting, to the user device, image information comprising image data, the image data being acquired by controlling at least one first home device equipped with a camera among the at least one home device, if an image information request for the control target home device is received from the user device.

7. The remote control method of claim 1, further comprising:
   interpreting a voice command received from the at least one home device; and
   generating a control command for the operation control of the at least one home device.

8. The remote control method of claim 7, wherein the voice command is recognized by a voice recognition sensor mounted on the at least one home device.

9. The remote control method of claim 8, further comprising:
   registering the user profile comprising user-specific voice information for voice recognition and user-specific authority information for the operation control of the at least one home device.

10. The remote control method of claim 9, further comprising determining whether to execute the control command based on the user profile, in response to the control command being received.

11. The remote control method of claim 1, wherein the user device comprises at least one of a smart television (TV), a mobile terminal, a tablet personal computer (PC), a remote controller, or an internet protocol (IP)-based wired/wireless phone.

12. The remote control method of claim 1,
    wherein the arrangement information is determined by detecting a location of the at least one home device, and
    wherein the location of the at least one home device is detected based on using an RF tag or a sensor, wherein the RF tag or the sensor is included in the at least one home device.

13. A gateway apparatus for remote control in a home network system comprising at least one home device, the gateway apparatus comprising:
    at least one transceiver configured to communicate with the at least one home device and a user device in a wired/wireless manner; and
    at least one processor configured to:
       control the at least one transceiver to:
          receive, from the at least one home device, operation state information and arrangement information of the at least one home device,
          receive, from the user device, a request for providing the operation state information and the arrangement information of the at least one home device,
          transmit, to the user device, the arrangement information and the operation state information, and
          receive, from the user device, a second control command for operation control of the at least one home device, recognize a first voice command by a user-specific voice recognition with a user profile, the user profile including a user-specific voice information and a user-specific authority information, generate a first control command based on the recognition of the first voice command, the first control command indicating a control target home device and an operation of the control target home device, determine the control target home device based on the first control command or the second control command, and further control the at least one transceiver to:

transmit, to the determined control target home device, the first control command or the second control command.

14. The gateway apparatus of claim 13, wherein at least one processor further configured to control the at least one transceiver to:

receive, from the control target home device, processing result information corresponding to execution of the second control command, and transmit, to the user device, the processing result information, and wherein the second control command received from the user device is generated by recognizing a second voice command.

15. The gateway apparatus of claim 13, wherein the second control command comprises at least one of identification information of the at least one home device, control details for the operation control, or authentication information of the user device.

16. The gateway apparatus of claim 13, wherein the at least one processor is further configured to control an operation of excluding a home device which has a malfunction possibility because a value indicating an operation state exceeds a reference value, among the at least one home device.

17. The gateway apparatus of claim 13, wherein the arrangement information comprises floor plan information indicating a room-specific arrangement of the at least one home device.

18. The gateway apparatus of claim 13, wherein the at least one processor is further configured to control an operation of transmitting, to the user device, image information comprising image data, the image data being acquired by controlling at least one first home device equipped with a camera among the at least one home device, if an image information request for the control target home device is received from the user device.

19. The gateway apparatus of claim 13, wherein the at least one processor is further configured to control an operation of interpreting a voice command received from the at least one home device and generating a control command for the operation control of the at least one home device.

20. The gateway apparatus of claim 19, wherein the voice command is recognized by a voice recognition sensor mounted on the at least one home device.

21. The gateway apparatus of claim 20, wherein the at least one processor is further configured to control an operation of registering the user profile comprising user-specific voice information for voice recognition and user-specific authority information, for the operation control of the at least one home device.

22. The gateway apparatus of claim 21, wherein the at least one processor is further configured to control an operation of determining whether to execute the control command based on the user profile, in response to the control command being received.

23. The gateway apparatus of claim 13, wherein the user device comprises at least one of a smart television (TV), a mobile terminal, a tablet personal computer (PC), a remote controller, or an internet protocol (IP)-based wired/wireless phone.

24. The gateway apparatus of claim 13, wherein the arrangement information is determined by detecting a location of the at least one home device, and wherein the location of the at least one home device is detected based on using an RF tag or a sensor, wherein the RF tag or the sensor is included in the at least one home device.

25. A remote control method in a home network system comprising at least one home device, the remote control method comprising:

transmitting, to a gateway apparatus, a request for providing operation state information and arrangement information of the at least one home device;

receiving, from the gateway apparatus, the arrangement information and the operation state information of the at least one home device, wherein the arrangement information and the operation state information are received by the gateway apparatus from the at least one home device;

transmitting, to the gateway apparatus, a second control command for operation control of the at least one home device in order for the gateway apparatus to determine a control target home device; and receiving, from the gateway apparatus, processing result information corresponding to execution of the second control command, wherein the gateway apparatus is configured to:

recognize a voice command by a user-specific voice recognition with a user profile, the user profile including a user-specific voice information and a user-specific authority information, generate a first control command based on the recognition of the voice command, the first control command indicating a control target home device and an operation of the control target home device, and determine the control target home device based on the first control command.

26. The remote control method of claim 25, wherein the second control command comprises at least one of identification information of at least one home device, control details for the operation control, or authentication information of the user device.

27. The remote control method of claim 25, wherein the arrangement information comprises floor plan information indicating a room-specific arrangement of the at least one home device.

28. The remote control method of claim 25, further comprising registering the user profile comprising voice information of the user and user-specific authority information for the operation control of the at least one home device in the gateway apparatus.

29. The remote control method of claim 28, further comprising receiving a notification message indicating whether the user is a registered user based on the user profile from the gateway apparatus.

30. The remote control method of claim 28, further comprising receiving a notification message indicating whether authority of the user is given to the first control command based on the user profile from the gateway apparatus.

31. The remote control method of claim 25,
wherein the arrangement information is determined by detecting a location of the at least one home device, and
wherein the location of the at least one home device is detected based on using an RF tag or a sensor, wherein the RF tag or the sensor is included in the at least one home device.

32. A user device for remote control in a home network system comprising at least one home device, the user device comprising:
at least one transceiver configured to communicate with a gateway apparatus; and
at least one processor configured to control the at least one transceiver to:
transmit, to the gateway apparatus, a request for providing operation state information and arrangement information of the at least one home device,
receive, from the gateway apparatus, the arrangement information and the operation state information of the at least one home device, wherein the arrangement information and the operation state information are received by the gateway apparatus from the at least one home device,
transmit, to the gateway apparatus, a second control command for operation control of the at least one home device in order for the gateway apparatus to determine a control target home device, and
receive, from the gateway apparatus, processing result information corresponding to execution of the second control command,
wherein the gateway apparatus is configured to:
recognize a voice command by a user-specific voice recognition with a user profile, the user profile including a user-specific voice information and a user-specific authority information,
generate a first control command based on the recognition of the voice command, the first control command indicating a control target home device and an operation of the control target home device, and
determine the control target home device based on the first control command.

33. The user device of claim 32, wherein the second control command comprises at least one of identification information of the at least one home device, control details for the operation control, or authentication information of the user device.

34. The user device of claim 32, wherein the arrangement information comprises floor plan information indicating a room-specific arrangement of the at least one home device.

35. The user device of claim 32, wherein the at least one processor is further configured to control an operation of registering the user profile comprising voice information of the user and user-specific authority information for the operation control of the at least one home device in the gateway apparatus.

36. The user device of claim 35, wherein the at least one processor is further configured to control an operation of receiving a notification message indicating whether the user is a registered user based on the user profile from the gateway apparatus.

37. The user device of claim 35, wherein the at least one processor is further configured to control an operation of receiving a notification message indicating whether authority of the user is given to the first control command based on the user profile from the gateway apparatus.

38. The user device of claim 32,
wherein the arrangement information is determined by detecting a location of the at least one home device, and
wherein the location of the at least one home device is detected based on using an RF tag or a sensor, wherein the RF tag or the sensor is included in the at least one home device.

* * * * *